US006711554B1

(12) United States Patent
Salzmann et al.

(10) Patent No.: US 6,711,554 B1
(45) Date of Patent: Mar. 23, 2004

(54) METHOD AND SYSTEM FOR MANAGING AND PREPARING DOCUMENTATION FOR REAL ESTATE TRANSACTIONS

(76) Inventors: Lee Salzmann, 332 Van Buren Dr., Centerport, NY (US) 11721; Joseph Mincone, 5 Wawapeck Rd., Cold Spring Harbor, NY (US) 11724; John Mincone, 12 Schubert Ct., South Huntington, NY (US) 11746; Andre J. Hollinger, 1140 5th Ave., New York, NY (US) 10128

( * ) Notice: Subject to any disclaimer, the term of this patent is extended or adjusted under 35 U.S.C. 154(b) by 0 days.

(21) Appl. No.: 09/475,978

(22) Filed: Dec. 30, 1999

(51) Int. Cl.[7] ............................................. G06F 17/60
(52) U.S. Cl. ......................................... 705/64; 705/38
(58) Field of Search ................................ 705/35, 37–40, 705/42–45, 64, 72, 78, 80; 715/505–508, 511–513, 530, 538, 541

(56) References Cited

U.S. PATENT DOCUMENTS

| 5,251,265 A | * | 10/1993 | Dohle et al. .................... 382/3 |
| 5,257,320 A | * | 10/1993 | Etherington et al. ........... 382/3 |
| 5,313,394 A | | 5/1994 | Clapp |
| 5,544,255 A | * | 8/1996 | Smithies et al. ............. 382/119 |
| 5,584,025 A | * | 12/1996 | Keithley et al. ............. 395/615 |
| 5,606,609 A | * | 2/1997 | Houser et al. ................. 380/4 |
| 5,615,268 A | | 3/1997 | Bisbee et al. |
| 5,640,577 A | | 6/1997 | Scharmer |
| 5,664,115 A | * | 9/1997 | Fraser .......................... 705/37 |
| 5,689,567 A | * | 11/1997 | Miyauchi ..................... 380/25 |
| 5,748,738 A | | 5/1998 | Bisbee et al. |
| 5,752,152 A | * | 5/1998 | Gasper et al. .............. 399/366 |
| 5,774,887 A | | 6/1998 | Wolff et al. |
| 5,799,157 A | | 8/1998 | Escallon |
| 5,867,153 A | | 2/1999 | Grandcolas |
| 5,878,403 A | | 3/1999 | DeFrancesco et al. |
| 5,893,914 A | | 4/1999 | Clapp |
| 6,011,873 A | * | 1/2000 | Desai et al. ................. 382/245 |
| 6,018,724 A | * | 1/2000 | Arent .......................... 705/44 |
| 6,067,533 A | * | 5/2000 | McCauley et al. ............ 705/38 |
| 6,260,024 B1 | * | 7/2001 | Shkedy ........................ 705/37 |
| 6,266,771 B1 | * | 7/2001 | Bellare et al. .............. 713/176 |
| 6,292,788 B1 | * | 9/2001 | Roberts et al. ............... 705/36 |
| 6,307,955 B1 | * | 10/2001 | Zank et al. ................. 382/121 |

FOREIGN PATENT DOCUMENTS

JP         2001084292 A  *  3/2001  ........... G06F/17/60

OTHER PUBLICATIONS

Maynard, Mortgages.com, Builder v22n11 pp 150–158 Sep. 1999, ISSN: 0744–1193.*

* cited by examiner

*Primary Examiner*—James P. Trammell
*Assistant Examiner*—Mary Cheung
(74) *Attorney, Agent, or Firm*—Tony A. Gayoso

(57) ABSTRACT

A method and system for preparing and managing real estate transfers and financing, including a system for preparation, production and storage of relevant documentation and the data contained therein; a system for coordinating, reconciling and transferring funds; and a system of analyzing and tracking the progress of numerous real estate transactions. The invention uses a database to minimize the redundancy involved in the preparation of all documentation needed for real estate closings. Information input into the database is used to generate the documentation necessary to complete real estate transfers, including all forms required by relevant financial institutions and government agencies. Such documentation includes handwritten signatures, which are digitally scanned and incorporated into the documents. Also, ancillary documentation can be scanned into the system and combined with other customer data and documentation. Thus a "closing package" can be compiled which contains electronic versions of virtually any document needed for closing a real estate transaction. Further included are scheduling features for coordinating one or many real estate transactions and management reporting for keeping track of a plurality of real estate transaction.

23 Claims, 29 Drawing Sheets

OPEN SCREEN

OPEN SCREEN

SET-UP SYSTEMS PREFERENCE SCREEN

BANK DATABASE SCREEN

FIG. 3

BANK CHECKING ACCOUNTS SCREEN

INVESTOR DATABASE SCREEN

FIG. 5

WAREHOUSE DATABASE SCREEN

FIG. 6

SUB-SERVICER DATABASE SCREEN

Sub-Servicer Information Screen

- 888
- 4610 — Add New
- 4615 — To search for an existing record use this list box.
- 4620 — Account #
- 4630 — Tax ID
- 4640 — Company Name
- Street / Suite/Floor
- City / State / Zip
- County / State for Docs
- Telephone / Fax
- E-mail Address / Web Address
- Contact / Tele / Ext.
- 4650 — Type
- 4660 — Card / Gift / Party / Date of Last Mailing
- Comments The REMMIS Group, Inc. Copyrighted 1999

FIG. 7

SET-UP EMPLOYEE SCREEN

SET-UP SCHEDULE SCREEN

ADD/UPDATE A FILE SCREEN

BORROWER SCREEN

FIG. 11

THE SELLER SCREEN

FIG. 12

LOAN SCREEN

PROPERTY SCREEN

FIG. 14

TITLE SCREEN

CLOSING SCHEDULE SCREEN

FUNDING SCREEN

HUD-1, PAGE 1 SCREEN

| | | |
|---|---|---|
| | Microsoft Access - [HUD-1 Page 1] | |
| 1105 | Select \| Borrower \| Seller \| Property \| Loan \| Title \| Schedule \| Checks \| Post Cls. \| Print \| Page 2 \| Aggregate \| TIL | |

Control #: 100000    HUD-1 SETTLEMENT STATEMENT (page1)

B. Type of Loan
1. ☐ FHA   2. ☐ FmHA   3. ☐ Conv. Unins.   4. ☐ VA   5. ☐ Conv. Ins.

| J. SUMMARY OF BORROWER'S TRANSACTION | | K. SUMMARY OF SELLER'S TRANSACTION | |
|---|---|---|---|
| 100. GROSS AMOUNT DUE FROM BORROWER | | 400. GROSS AMOUNT DUE TO SELLER | |
| 101. Contract Sales Price | $130,000.00 | 401. Contract Sales Price | |
| 102. Personal Property | $0.00 | 402. Personal Property | |
| 103. Settlement Charges to Borrower (from line 1400) | $7,382.49 | 403. | |
| 104. | $35,000.00 | 404. | |
| 105. | $50,000.00 | 405. | |
| ADJUSTMENT FOR ITEMS PAID BY SELLER IN ADVANCE | | ADJUSTMENT FOR ITEMS PAID BY SELLER IN A | |
| 106. City/Town taxes to: | $106.00 | 406. City/Town taxes to: | |
| 107. County taxes to: | $500.00 | 407. County taxes to: | |
| 108. School taxes to: | $200.00 | 408. School taxes to: | |
| 109. Assessments to: | $100.00 | 409. Assessments to: | |
| 110. Fuel | $20.00 | 410. Fuel | |
| 111. | $20.00 | 411. | |
| 112. | $20.00 | 412. | |
| 120. GROSS AMOUNT DUE FROM BORROWER | $223,348.49 | 420. GROSS AMOUNT DUE TO SELLER | |
| 200. AMOUNTS PAID BY OR IN BEHALF OF BORROWER | | 500. REDUCTIONS IN THE AMOUNT DUE TO SELL | |
| 201. Deposit or Earnest money | $122.00 | 501. Excess deposit (see instructions) | |
| 202. Principal amount of new loan(s) | $102,000.00 | 502. Settlement charges to seller (line 1400) | |
| 203. Existing loans taken subject to | $0.00 | 503. Existing loans taken subject to | |
| 204. | $0.00 | 504. Payoff of 1st Mtg. | |
| 205. | $0.00 | 505. Payoff of 2nd Mtg. | |
| 206. | $0.00 | 506. | |
| 207. | $0.00 | 507. | |
| 208. | $0.00 | 508. | |
| 209. | $0.00 | 509. | |
| ADJUSTMENTS FOR ITEMS UNPAID BY SELLER | | ADJUSTMENTS FOR ITEMS UNPAID BY SELLER | |
| 210. City/Town taxes to: | $0.00 | 510. City/Town taxes to: | |
| 211. County taxes to: | $0.00 | 511. County taxes to: | |
| 212. School taxes to: | $0.00 | 512. School taxes to: | |
| 213. Assessments to: | $0.00 | 513. Assessments to: | |
| 214. Fuel | $0.00 | 514. Fuel | |
| 215. | $0.00 | 515. | |
| 216. | $0.00 | 516. | |
| 217. | $0.00 | 517. | |
| 218. | $0.00 | 518. | |
| 219. | $0.00 | 519. | |
| 220. TOTAL PAID BY/FOR BORROWER | $102,122.00 | 520. TOTAL REDUCTIONS IN AMOUNT DUE SELLE | |
| 300. CASH AT SETTLEMENT FROM/TO BORROWER | | 600. CASH AT SETTLEMENT TO/FROM SELLER | |
| 301. Gross amount due from borrower (line 120) | $223,348.49 | 601. Gross amount due to seller (line 420) | |
| 302. Less amount paid by/for borrower (line 220) | $102,122.00 | 602. Less amount paid by/for seller (line 520) | |
| 303. CASH ☒ FROM ☐ TO BORROWER | $121,226.49 | 603. CASH ☐ TO ☒ FROM SELLER | |

FIG. 19

HUD-1 PAGE 2 SCREEN

| | | | | | | | | | | | | |
|---|---|---|---|---|---|---|---|---|---|---|---|---|
| | Select | Borrower | Seller | Property | Loan | Title | Schedule | Checks | Post Cls. | Print | Page 1 | Aggregate | TIL |

1105 ──

Control # 100000      HUD-1 SETTLEMENT STATEMENT (page2)

| | | | | | |
|---|---|---|---|---|---|
| 700. | TOTAL SALES/BROKER COMMISSION: | | | | PAID FR BORRO FUNDS SETTLE |
| | BASED ON PRICE: | $0.00 @ 0.000 % = $0.00 | | | |
| | DIVISION OF COMMISSION (LINE 700) AS FOLLOWS: | | | | |
| 701. | $5,000.00 to | | p.o.c. | $1,000.00 | |
| 702. | $0.00 to | | p.o.c. | $0.00 | |
| 703. | Commission paid at settlement | | | | $ |
| 704. | | | | | $ |
| 800. | ITEMS PAYABLE IN CONNECTION WITH LOAN | | | | |
| 801. | Loan Origination Fee of: | 1.000 % to: | p.o.c. | $0.00 | $1,02 |
| 802. | Loan Discount Fee of: | 1.000 % to: | p.o.c. | $0.00 | $1,02 |
| 803. | Appraisal fee to: | | p.o.c. | $0.00 | $ |
| 804. | Credit report to: | | p.o.c. | $0.00 | $ |
| 805. | Application fee to: | | p.o.c. | $0.00 | $ |
| 806. | Underwriting fee to: | | p.o.c. | $0.00 | $35 |
| 807. | Underwriting fee to: | | p.o.c. | $0.00 | $ |
| 808. | Post Closing Review Fee to: | | p.o.c. | $0.00 | $ |
| 809. | Messenger Fee to: | | p.o.c. | $0.00 | $ |
| 810. | Flood Certification Fee to: | | p.o.c. | $0.00 | $ |
| 811. | Extra fee | | p.o.c. | $0.00 | $ |
| 900. | ITEMS REQUIRED BY LENDER TO BE PAID IN ADVANCE | | | | |
| 901. | Interest from 08/27/1999 to 08/31/1999 # of Days 5 @ $22.82 per day | Factor: 360 | | | $11 |
| 902. | Mortgage insurance premium for | 0 months to | p.o.c. | $0.00 | $ |
| 903. | Hazard insurance premium for | 0 years to | p.o.c. | $0.00 | $ |
| 904. | Flood insurance premium for | 0 years to | p.o.c. | $0.00 | $ |
| 905. | | | | | $ |
| 1000. | RESERVES DEPOSITED WITH LENDER | | | | $ |
| 1001. | Hazard insurance | 10 months @ $47.33 per month | | | $47 |
| 1002. | Mortgage insurance | 2 months @ $109.34 per month | | | $21 |
| 1003. | Flood Insurance | 0 months @ $0.00 per month | | | $ |
| 1004. | County property tax | 8 months @ $159.82 per month | | | $1,27 |
| 1005. | School property tax | 17 months @ $119.47 per month | | | $2.03 |
| 1006. | Village property tax | 0 months @ $0.00 per month | | | $ |
| 1007. | City property tax | 0 months @ $0.00 per month | | | $ |
| 1008. | Sewer/water tax | 0 months @ $0.00 per month | | | $ |
| 1009. | Aggregate adjustment | | | | $ |
| 1100. | TITLE CHARGES | | | | |
| 1101. | Settlement or closing fee to: | | | | $ |
| 1102. | Abstract or title search to: | | | | $ |
| 1103. | Title examination to: | | | | $ |
| 1104. | Title insurance binder to: | | | | $ |
| 1105. | Document preparation to: | | | | $ |
| 1106. | Notary fees to: | | | | $ |
| 1107. | Attorney fee to: | Mincone & Mincone, P.C. | | | $59 |
| | (includes above item Numbers 1101, 1103 and 1105) | | | | |
| 1108. | Title Insurance to: | | | | $ |
| | (includes above item Numbers 1109 and 1110) | | | | |
| 1109. | Lender's coverage amount | $102,000.00 | fee | $0.00 | |
| 1110. | Owner's coverage amount | $130,000.00 | fee | $0.00 | |
| 1111. | Departmental searches | | | | $ |
| 1112. | Survey inspection | | | | $ |

FIG. 20

HUD-1 FORM

FIG. 21

AGGREGATE SCREEN

TRUTH IN LENDING FORM

FIG. 23

POST-CLOSING SCREEN

ELECTRONIC LOAN/ DOCUMENT DELIVERY

DOCUMENT SELECTION/ TRANSMITTAL SCREEN

TRACKING AND REPORTING SCREEN

ACCOUNTING MISCELLANEOUS SCREEN

METHOD AND SYSTEM FOR MANAGING AND PREPARING DOCUMENTATION FOR REAL ESTATE TRANSACTIONS

COPYRIGHT NOTICE

A portion of the disclosure of this patent document contains material that is subject to copyright protection. The copyright seller has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to a method and system for preparing and managing real estate transfers and financing, which includes a system for preparation, production, delivery and storage of relevant documentation and the data, contained therein.

BACKGROUND OF THE INVENTION

The process of buying, selling or even just financing real estate generally involves a great deal of documentation. Most of the documentation involved requires redundant personal information and signatures of the parties. What is more, the financing involved in real estate transactions can include lengthy applications that often need to be completed more than once if financing is being sought from more than one potential lender.

Another aspect of real estate transactions involves the scheduling and coordination of the parties and finances involved. This generally includes buyers, sellers, attorneys, real estate settlement providers, real estate agents, financial institution representatives, and others. All these people need to schedule a mutually convenient meeting time and place for the closing.

Also, a reconciliation of funds being transferred between parties must be coordinated so that the closing will be funded properly. Many different real estate professionals, branches of government and others must be paid at or near the closing date. This whole process is often made difficult by last minute adjustments in the agreed upon loan rates, taxes due and other variables.

Real estate transactions are further complicated by the fact that much of the information contained in the required documentation is often transferred or translated manually from the forms that were completed by hand to an electronic medium such as a computer. The involved real estate attorney, real estate settlement provider, Realty Company, Title Company or financial institution, often does such a transfer. The information, once stored in electronic form, can then be delivered to mortgage banks, financial institutions, government sponsored agencies, document custodians or can even be used by word processing software for completing the forms and documentation needed in "closing" the real estate transaction. Not only is this manual transfer or translation of data cumbersome, but also it is time consuming and prone to typographical and other errors.

Once the mortgage transaction is closed, copies of the final documents are usually stored or maintained by the attorneys, mortgage banks, financial institutions, and document custodians involved in the real estate transaction. The shear bulk of the papers impose significant storage costs to the professionals involved. This cost can be further exagerated when copies of the documentation are translated to microfiche, scanned to electronic format or other means of long-term mass document storage.

What is more, the information obtained during the real estate transaction is very valuable to professionals regularly involved in these transactions. This information includes detailed demographic data about the parties. Professionals often use such information for marketing or follow-up promotions of their goods or services. Also, the non-confidential aspects of this information can be sold or traded to companies that collect consumer data. For this reason, it is important that certain parts of the information collected be translated and stored in a database or any easy to use means of data storage and retrieval.

Currently, the majority of the real estate mortgage industry still uses very antiquated methods for preparing closing documents. The sale and financing of real estate has historically been associated with a great deal of paper documentation due to longstanding statutes and laws requiring written, signed and notarized documents for the legal transfer of land and to bind lenders and borrowers to the terms of fair loan agreements. Most often typewriters or even word processors are used, but the completed documents are not stored electronically. Also, during the process of generating the necessary documents, much of the data is repeated throughout the documents. Such repetition wastes time and is prone to human error.

Some companies have developed more sophisticated methods of preparing mortgage documents and handling the data needed for this process. For example, EDS™ (Electronic Data Systems Corp.) have developed what they call the Accelerated Closing and Delivery Services (ACDS). This system is designed to handle and transfer mortgage closing data, while reducing or even eliminated the amount of paper needed for a mortgage closing. Using this system, a lender, attorney or other mortgage facilitator will scan, fax or transfer the hand written or typed completed application papers to the company (EDS). The company processes and compiles the information from the application papers and generates electronic versions of the closing documents. Before or during a closing, a facilitator can access ACDS by modem or dedicated phone line to review this information. This system is accessed using a computer that is connected to the company's electronic image repository. At the closing table, the parties can visually inspect the closing documents displayed on a computer monitor. What is more, ACDS uses well-known signature digitizer pads to add party signatures to the closing documents. Hard copies of all documents can then be generated or the parties can be given a computer diskette, which contains the visual image of the closing documents. However, even the most advanced systems, like ACDS, while reducing some redundancies of data input and the amount of paper used in finalizing closing documents, do not provide many tools needed to facilitate real estate transactions for the professionals that work in this industry.

SUMMARY OF THE INVENTION

In accordance with the present invention there is presented a method and system for preparing and managing real estate transfers and financing. This includes a system for preparation, production and storage of relevant documentation and the data contained therein; a system for coordinating, reconciling and transferring funds; and a system of analyzing and tracking the progress of numerous real estate transactions.

One of the key elements to the invention uses a customized computer database to input and store information, which minimizes the redundancy involved in the preparation of all documentation needed for real estate closings. The input can be done manually, or through electronic data transfer methods. The information stored in this customized computer database relates primarily to that which is required to transfer or finance real estate, but also includes customer information required from financial institutions and government agencies for various real property transactions and applications. This information is then used by the method and system disclosed herein to generate the documentation necessary for a desired real estate transaction, while eliminating redundancy during the inputting of such information. This system can be designed or maintained to contain all standard forms used by relevant financial institutions and government agencies. Thus, virtually every necessary document needed for a binding transaction involving the transfer or financing of real estate can be generated using this system.

In accordance with another aspect of the present invention, by electronically storing more than just the images of the closing documents, much of the information contained therein can be used by the attorneys, lenders and other professionals using this system to maintain useful client information. This retained information can then reduce the amount of data needed if the same client returns for other services. Also, the professional as a marketing tool or for promotional material can use this information.

In accordance with another aspect of the present invention, a signature digitizer pad or electronic signature pen can be used as part of the instant invention. Such a pad or pen translates a user's signature into a digital image or file, which can then be stored, reproduced and manipulated like any other digital computer image or file. A user, signs his or her name using this device that either requires a special pad with a pen shaped object or a special pen. The signature can then be reproduced on legal documents generated by this system.

In accordance with another aspect of the present invention, ancillary documentation can be scanned, using a standard electronic document-scanning device, and the digital image combined with other customer data and documentation. Copies or images of these ancillary documents can then be stored or transferred electronically. Thus a "closing package" can be compiled which contains electronic versions of virtually any document needed for closing a real estate transaction.

In accordance with another aspect of the present invention, the electronic storage of the above mentioned data and images could facilitate their transfer or delivery to the appropriate parties, institutions or agencies before or during a real estate closing. This data and images can be transferred using secure means of electronic communications, such as a dedicated phone line, a virtual private communications network or even the Internet, if proper security precautions are taken (i.e., the use of encryption software). Such transfers can take place as part of the delivery of a loan/loan portfolio to a lender or other institution. Also, the transfers can take place in order to facilitate a closing that involves parties physically located in separate facilities or locations.

In accordance with another aspect of the present invention, the present method and system includes scheduling features for coordinating a real estate closing and for improving the efficiency of handling multiple closings. Very often professionals that host real estate closings coordinate a plurality of such transaction within the same day or week. The instant invention includes a calendar and scheduling system for reserving facilities to accommodate the parties. This scheduling and coordinating feature can be used to send reminders or notifications to all the parties and can be used by the host to more efficiently schedule such events.

In accordance with yet another aspect of the instant invention, by using electronic communications to transfer data and information relating to a real estate closing, the information needed to accurately calculate and reconcile the exact amount of funds being transferred between parties can be obtained quickly and easily. This is another benefit of inputting and maintaining all relevant data in electronic form. In the same way that e-mail has increased speed and efficiency in transferring text messages for businesses and the general public, the instant system can transmit or receive financial information in order to efficiently reconcile funds. What is more, by knowing the amounts needed to close on a real estate transaction, the instant method and system provides a reconciliation and check writing feature that can automatically draft all checks needed to finalize the closing. Also, the system can accommodate releasing specified funds on different days in order to accommodate a lender or other party. This too can expedite and facilitate the entire real estate closing process and is accomplished through electronic communications with the banks holding such funds.

The transfer of data can occur into the system (i.e., import data) or out of the system (i.e., export data. Using Mortgage Banking Association standards, including Extensible Markup Language (XML), data and sets of particular information can be exchanged electronically. Such a common language allows various types of software and new technologies to communicate, while still understanding the content of documents and the related information being transmitted. XML establishes a structure for the information exchanged (i.e., words, pictures, signatures, etc.) and some indication of what role that information plays in the document being transmitted. The instant invention uses such standards to import and export documents and data electronically. Such document and data transfers can take place over a global communications network such as the Internet or any other means of electronic data transfer.

In accordance with even another aspect of the instant invention, the database portion of this method and system can be used to provide complete management reporting to the professionals using it. Customized reports can be generated based on any and all data maintained. Whether it be accounting, outstanding items, work-flow, or any other information, a professional using this method and system could track and report various aspects of this business. Also, as this method and system stores its information electronically, such reports could be transmitted to remote locations using any means of electronic communications,

BRIEF DESCRIPTION OF THE DRAWINGS

Those and other objects and advantages of the present invention will become more apparent by referring to the following detailed description and accompanying drawings in which:

FIG. 3 is an illustration of the Bank Database screen.

FIG. 5 is an illustration of the Investor Database screen.

FIG. 6 is an illustration of the Warehouse Database screen.

FIG. 7 is an illustration of the Sub-Servicer Database screen.

FIG. 11 is an illustration of the Borrower screen.

FIG. 12 is an illustration of the Seller screen.

FIG. 14 is an illustration of the Property screen.

FIG. 19 is an illustration of the HUD-1, page 1 screen.

FIG. 20 is an illustration of the HUD-1, page 2 screen.

FIG. 21 is an illustration of the HUD-1, form.

FIG. 23 is an illustration of the Truth In Lending form.

DETAILED DESCRIPTION

The preferred embodiment of the invention uses a computer software package to facilitate and enable the primary features of the instant invention. The software includes a basic word processing program such as Microsoft Word®, a database program such as Microsoft Access®, Fox Pro® or a Visual Basic®, and a system for providing data entry, such as computer terminals with keyboards, document scanners, and a digital signature device. Real estate professionals, such as attorneys, settlement agents, title companies and financial institutions will primarily use this method and system.

I. Introduction

Figure 1:
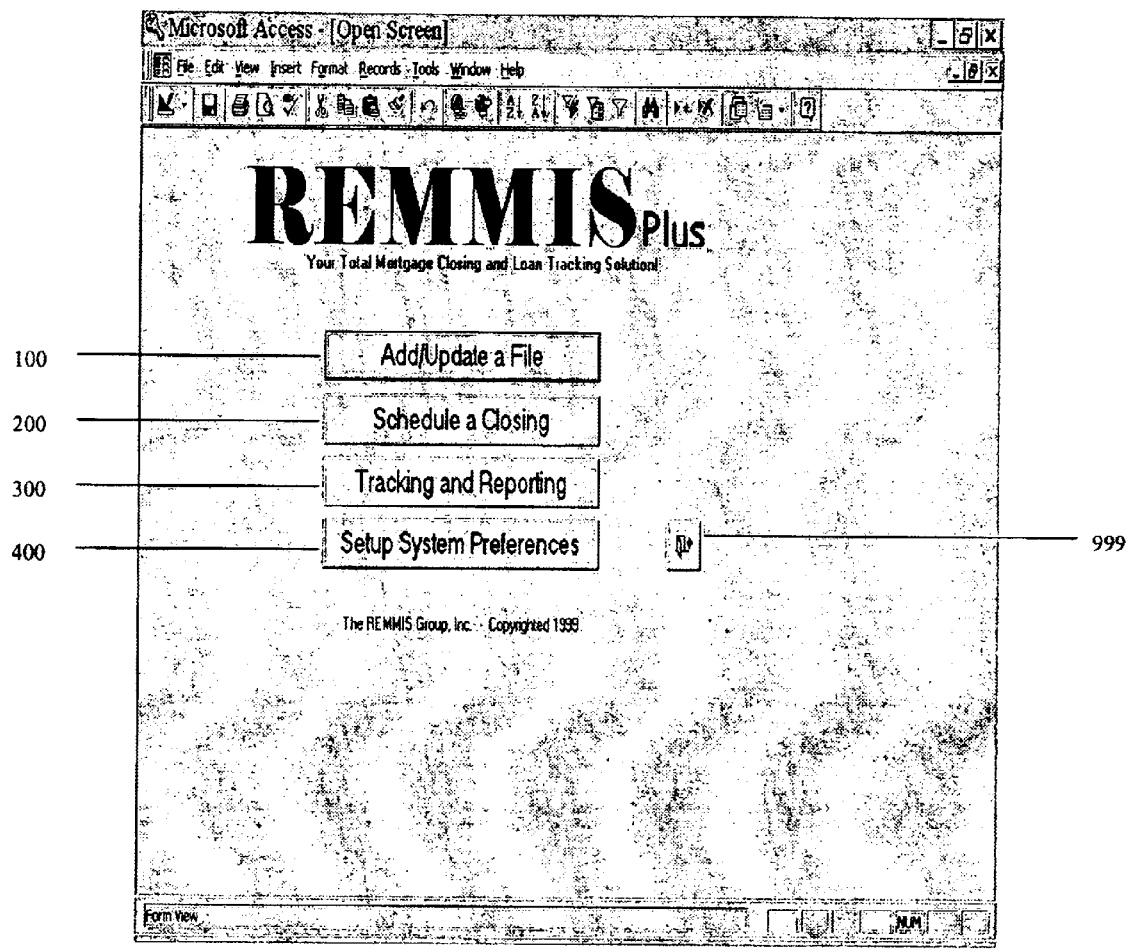
FIG. 1 is an illustration of an initial computer screen from which a real estate professional can choose what aspect of the instant system he wants to use.

With reference to the embodiment illustrated in FIG. 1, the anticipated software package provides an opening screen. As with most screens described herein, navigation is done using well known point and "click" features that are common to Windows® based software. The "Add/Update a File" button 100 is generally the starting point for a new file. As soon as a file is received, information from that file should be input to the system. This button is also selected when file information must be changed or updated. The "Schedule a Closing" button 200 uses the scheduling features of the instant invention to reserve a time and place for the closing to take place. The "Tracking and Reporting" button 300 allows a user to keep track of what closings are taking place on a particular date or in a particular location. Also, this button is used to check information relating to the funding or financing involved in a particular file. Other data tracking features are accessed through this button as will be discussed below. When a user is ready to generate a hard copy of the real estate closing documents, this feature would also be used. The "Setup System Preferences" button 400 is used to setup the system with the most basic information regarding the company or real estate professional using the software. This feature is also used for updating the system with basic information regarding other companies and professionals that are commonly involved in real estate transactions. Finally, the "exit" button 999 is used once a user wishes to shut down the software program described herein. Other standard Windows® type features can be seen along both the top and bottom of the screen shown in FIG. 1.

Figure 2:
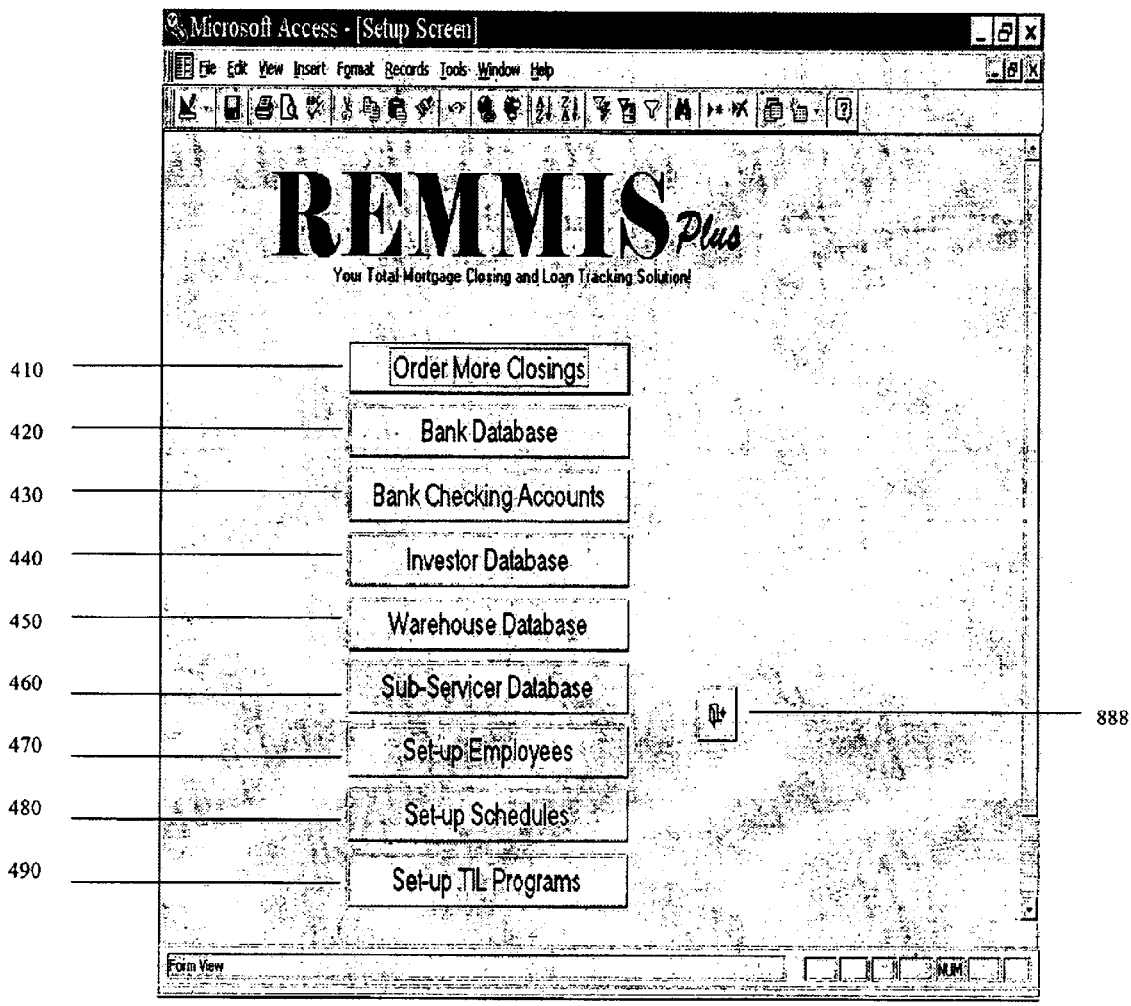
FIG. 2 is an illustration of the Setup System Preferences screen.

FIG. 2 illustrates the screen that is displayed when the "Setup System Preferences" button 400 from FIG. 1 is selected. Prior to using the software described herein for real estate transactions, a user must setup several supporting databases, which are indicated in FIG. 2. The "Order More Closings" button 410 can be selected to update the system to enable and allow additional closing transaction. A licensee of the instant invention will be provided a code to enter, which allows a set amount of transactions or closing to be entered in the system. In order to enter additional transactions or closings, the licensee must re-subscribe or renew the licensee. After renewal, the licensee will be given a new code, which allows more closings to be entered using the system. The database of the instant invention contains embedded codes which correlate to the codes given to licensee's, thus they will act as a key to the system. The "Bank Database" button 420 should be selected when setting up lender information. The "Bank Checking Account" button 430 is used to setup checking accounts from which funds can be drawn. The "Investor Database" button 440 is used to setup mortgage investor information. The "Warehouse Database" button 450 is used to setup warehouse bank information. Large institutional lenders generally have "cash on-hand" to fund loans they close. Smaller lenders will typically "borrow" the monies required to fund a closing loan from warehouse lenders, at least until the loan is purchased by a mortgage investor. The "Sub-Servicer Database" button 460 is used to enter information relating to all individuals or entities that are not considered mortgage banks, mortgage investors or warehouse banks. Examples of Sub-Servicers are attorneys, title companies, mortgage brokers and real estate brokers. The "Set-up Employees" button 470 is used to setup employee designations, such as job titles or duties and is used for setting up passwords that will be used throughout the system. The "Set-up Schedules" button 480 is used to customize the closing schedule screens described below. The "Set-up TIL Programs" button 490 is used for entering loan program information for the printing of a Truth in Lending form. Finally, a "back" button 888 is provided which will take the user back to the previous screen, which in this case is the Opening screen. The "back" button 888 is seen in numerous other screens, unlike the exit button 999 that is only available on the Opening screen.

II. The System Set-up

Figure 3:
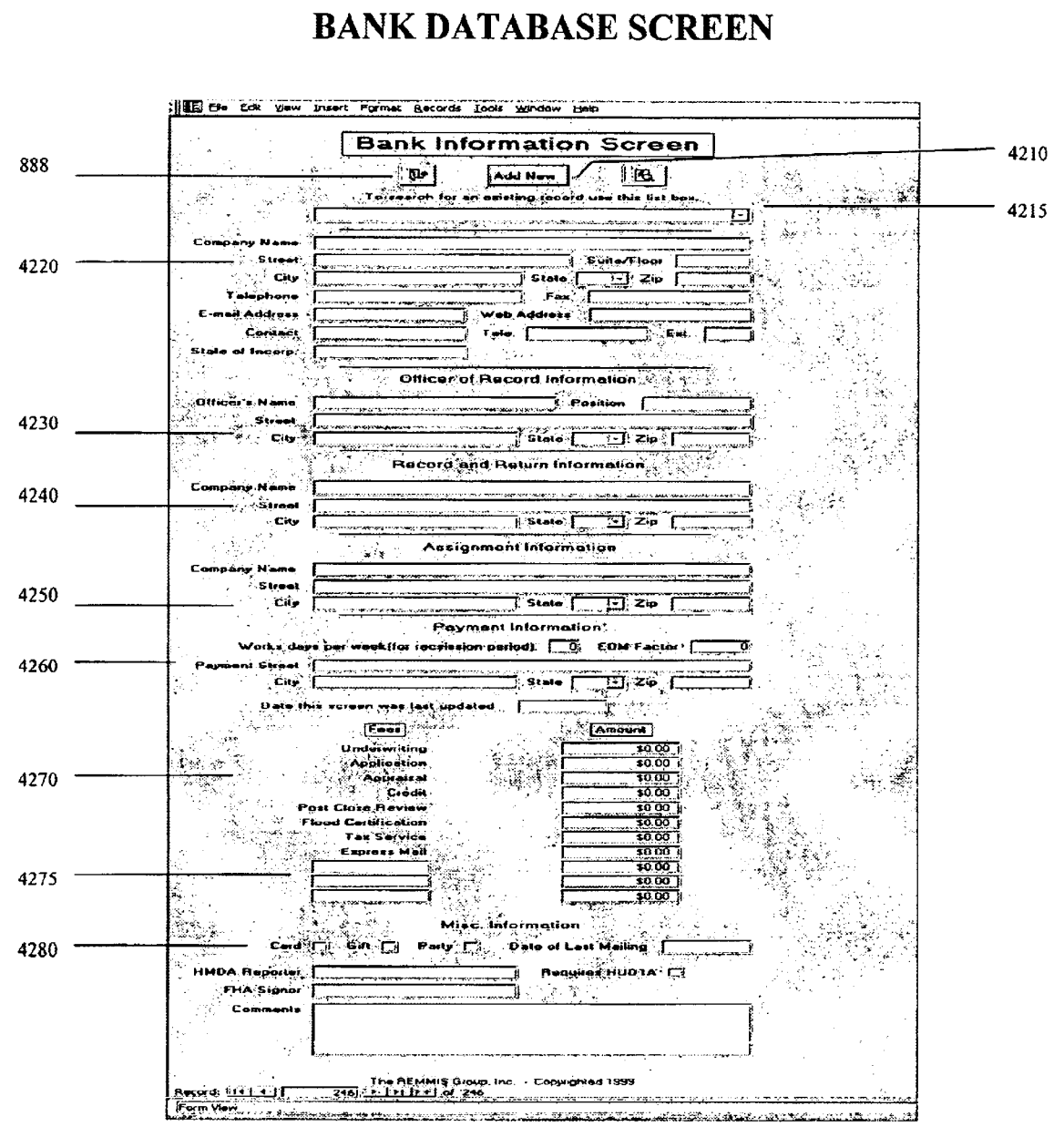

FIG. 3 illustrates the screen that is displayed when the "Bank Database" button is pressed on the Set-up System Preferences screen discussed above. Normally, when a user gets to this screen most of the fields are filled-in. In effect, all the fields on this screen will contain information from the first bank whose information is in the existing database. When a user wishes to select a different bank they can use the Search Box 4215 to select a bank that has been previously entered into the database. One can use the drop-down arrow to select the other banks already in the database. If a desired bank is not already in the database, the user can select "Add New" button 4210 which, can be used to enter information for a new bank. When the "Add New" button is selected, all the fields visible on this screen will go blank allowing a user to enter new data. The first section on this screen 4220 contains the basic name, address and telephone number information relating to a specific bank. The fields are somewhat self-explanatory so that a user can enter information more easily and with little training. The second section titled "Officer of Record Information" 4230 can be used to track information concerning the primary officer or contact at a bank. The "Record and Return Information" section 4240, "Assignment Information" section 4250, and "Payment Information" section 4260 are self-explanatory and are used to track specific information relating to the same bank displayed in the first section 4220. Additionally, some of the fees associated with a bank and its transactions can be listed in the lower section 4270. The program even allows for three miscellaneous field boxes 4275 for entering special fees that would be particular to that banking institution. Finally, the Miscellaneous Information Section 4280 is used to track other marketing and basic banking information.

Figure 4:
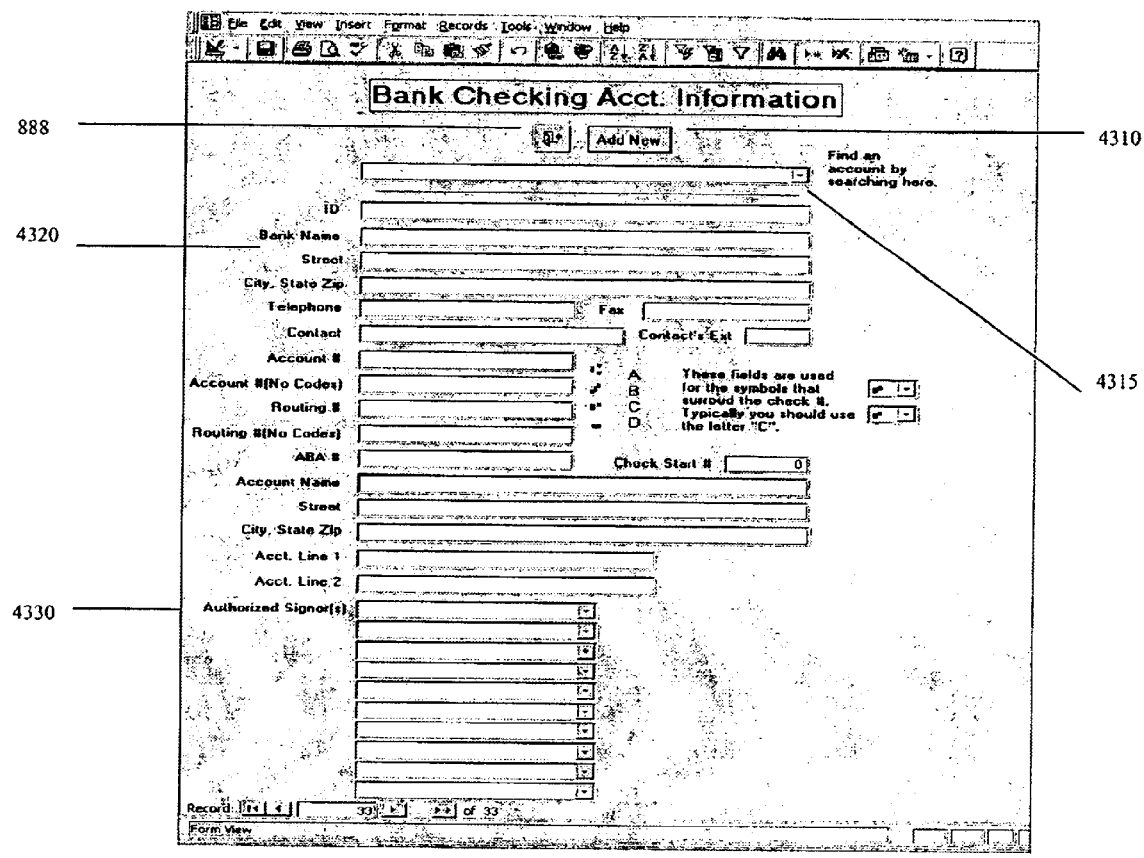
FIG. 4 is an illustration of the Bank Checking Accounts screen.

FIG. 4 is the Bank Checking Accounts screen. This screen is accessed by clicking the "Bank Checking Account" button 430 on the Set-up System Preferences screen (see FIG. 2). Once again as with the previous screen, when a user first arrives at this screen most of the fields should contain data relating to the first record from the database. The information from the bank checking account screen can be used in a mortgage closing for disbursing funds. A feature that is discussed in more detail below is the check writing ability of this invention. The Bank Checking Account fields contain the critical information required to write checks. In other words, this information can be used during a real estate closing to produce the actual checks needed for the closing by both the buyers and sellers. Approval must be obtained from any banking institutions whose checks will be used in connection with this feature.

If a user wishes to search for a particular account that is available within the program, he or she is able to click the down arrow on the search field 4315 and select from the drop-down list. Once an account is selected from the drop down list, it and its corresponding information will appear in the fields on this screen. When a user desires to create a new account, they can use the Add New button 4310 to clear all the fields and allow data input. The general bank account information fields 4320 on this screen are used miscellaneous bank account information. These fields must be completed if the check writing capabilities were going to be used. Once set of fields that is important to note is the Authorized Signor's fields 4330, which are used to provide the user with a list of people who are authorized to perform transactions from the bank account in question.

Figure 5:
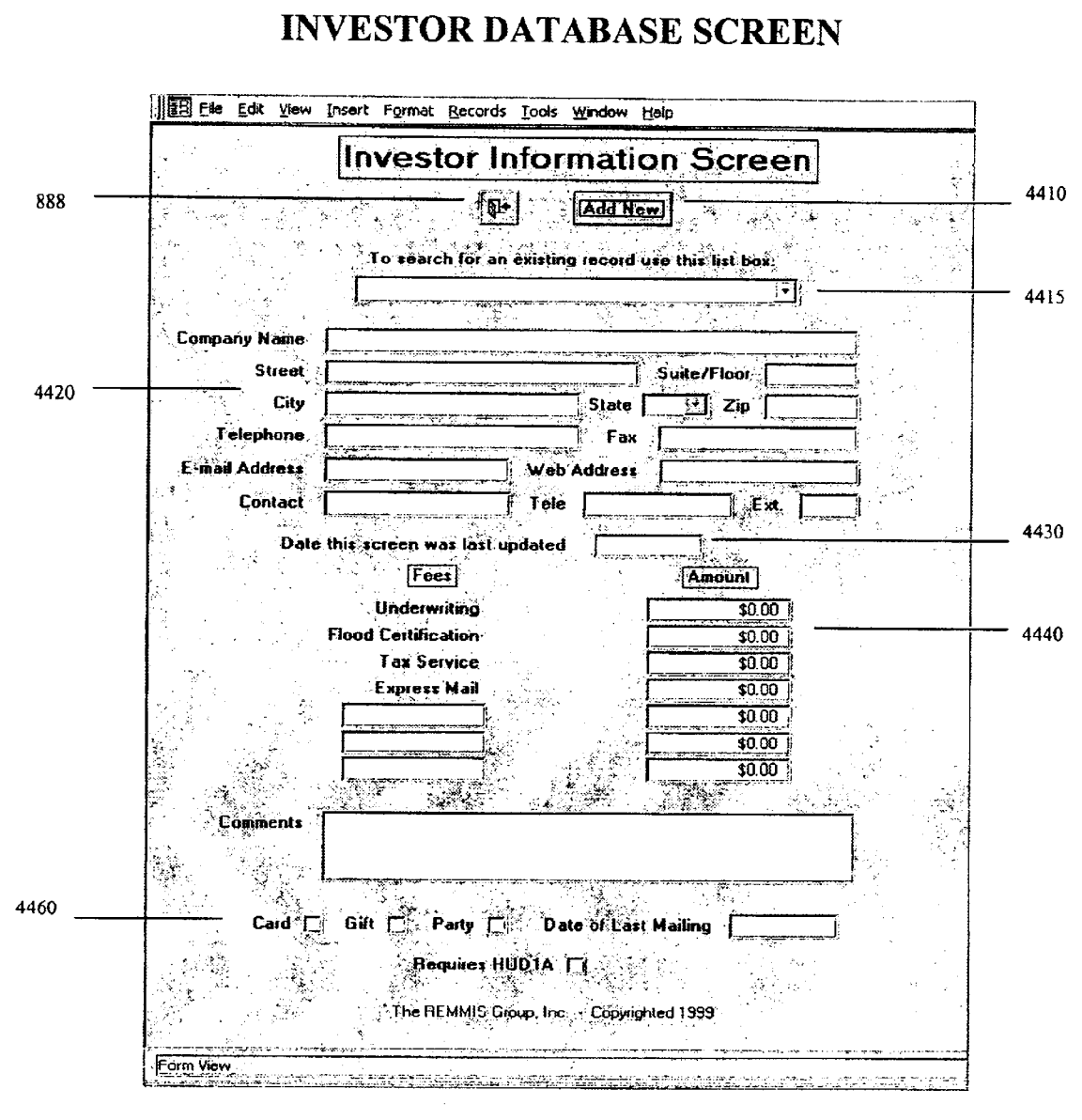

FIG. 5 illustrates a data screen that is used for showing mortgage investor information. This screen is accessed by clicking the "Investor Database" button 440 on the Set-up System Preferences screen (see FIG. 2). During real estate transactions that involve a mortgage, it is not uncommon for smaller mortgage bankers to sell their loans to mortgage investors. In fact, most loans that are sponsored by smaller mortgage companies are approved for purchase from mortgage investors prior to the actual closing. Other than the basic information fields 4420, this screen can contain important information relating to assignment requirements, such as the requirements fields 4440 and 4460. A few blank requirements fields are included to allow for unusual assignment requirements that a particular mortgage investor might have. As these fields are subject to frequent change, it is helpful to have last updated fields 4430 or 4450. Further, as with previous screens an Add New button 4410 and a search field 4415 are provided to create new records and access already stored records. Additionally, a promotions field 4470 is provided to track scheduled contacts with these investors. Promotions can include cards or gifts sent to the investor or even invitations to parties and other invents.

Figure 6:
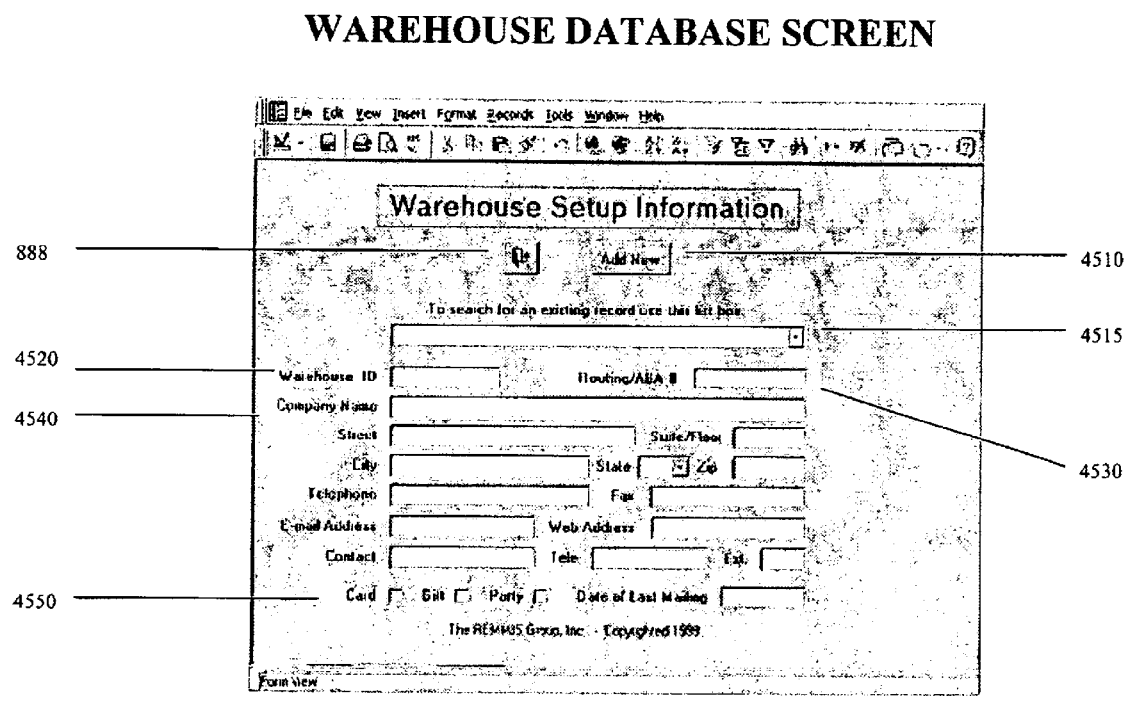

There are various methods used by mortgage bankers and lenders to fund a loan and a small mortgage banker does not have to be used. Larger mortgage bankers or lenders can also be used to finance a loan. A large mortgage bank is one that typically has "cash-on-hand" to fund a loan, whereas smaller mortgage banks need to "borrow" the monies they use to fund a closing before it is purchased by a mortgage investor. The small mortgage bankers typically "borrow" their monies for this intermediate phase from what are referred to as warehouse lenders. FIG. 6 shows a screen that can be used to track information relating to such warehouse lenders. This screen is accessed by clicking the "Warehouse Database" button 450 on the Set-up System Preferences screen (see FIG. 2).

In keeping with previous screen formats, an Add New button 4510 and Search field 4515 are provided to create new and edit existing warehouse investor records. In addition to the general warehouse investor information fields 4540, each such investor is provided an identification number that is displayed in the Warehouse ID field 4520. Additionally, a Routing number field 4530 is provided for reference during a loan closing. Finally, as above a promotions field 4550 is also provided for warehouse investors.

There are numerous entities other than mortgage bankers, warehouse lenders and investors that can be involved in real estate transactions. All these other entities are referred to as Sub-Servicers. FIG. 7 illustrates the "Sub-Servicer Database" Screen and is used to track information relating to these other entities such as attorneys, title companies, mortgage brokers, real estate brokers and others. This screen is accessed by clicking the "Sub-Servicer Database" button 460 on the Set-up System Preferences screen (see FIG. 2). As with other screens, the Sub-Servicer Information Screen contains an Add New button 4610, a Search field with drop down list 4615, general information fields 4640, promotions fields 4660 and even an identifying number field 4620. Additionally, this screen can track tax identification numbers 4630 and includes a field to indicate the type of Sub-Servicer, such as those mentioned above.

Figure 8:
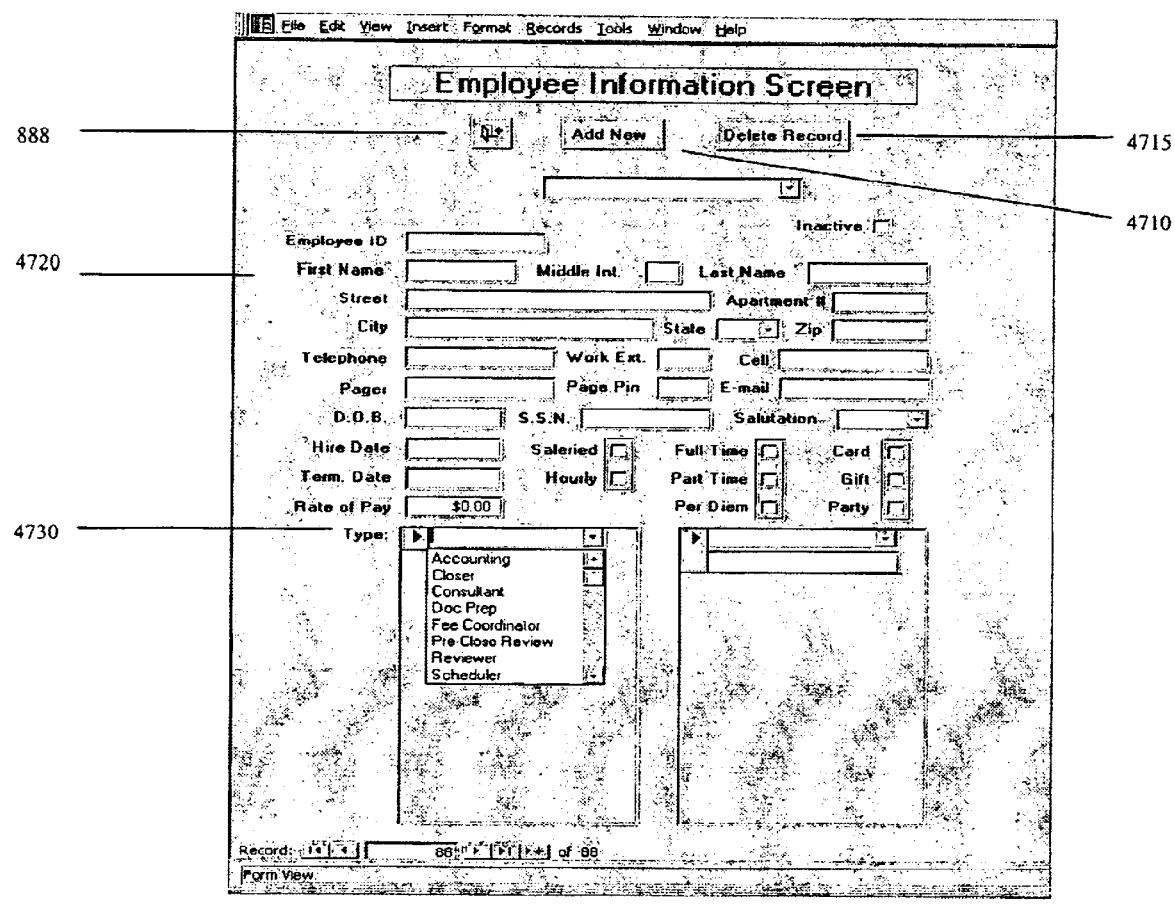
FIG. 8 is an illustration of the Set-up Employee screen.

Additionally, information relating to employees of the company or organization using the software package envisioned by the instant invention must also be maintained. This information, like that of the other screens is important throughout the program when using the drop down boxes that are available. Thus, as will be discussed more fully below, when using the scheduling features of the instant invention the drop down lists can be used to schedule employees to handle numerous real estate closings. FIG. 8 is the Set-up Employee screen and is accessed by clicking the "Set-up Employees" button 470 on the Set-up System Preferences screen (see FIG. 2). On this screen, the employee's name is entered in the name field 4720 and the type of duty they are capable of performing is selected from the drop down box in the type field 4730. Similar to the previous screens, there is an Add New button 4710, which allows information regarding new employees to be entered. When a user wishes to delete an employee from the database, they can click on the employee name they wish to delete and then click the "Delete Record" button 4715.

Figure 9:
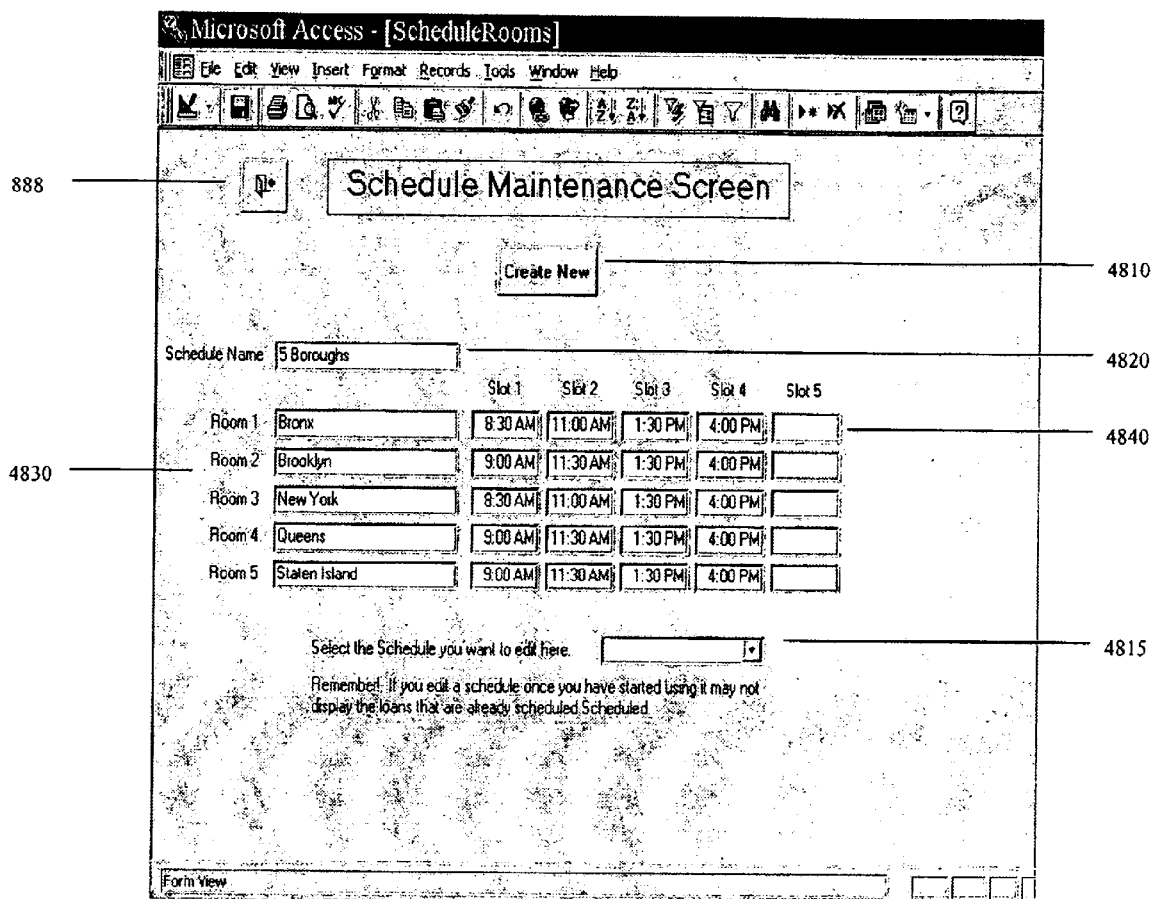
FIG. 9 is an illustration of the Set-up Schedule screen.

If a user intends on using the scheduling features of the instant invention the Schedule Maintenance Screen must be used, see FIG. 9. This screen is accessed by clicking the "Set-up Schedule" button 480 on the Set-up System Preferences screen (see FIG. 2). This screen allows a user to define different schedules for each location at which closings can be conducted. As with previous screens, there is a Create New record button 4810 and a Search field 4815. Otherwise, the screen should be rather straight forward in that it provides the name of the selected schedule in a field 4820 and a smaller spread sheet area containing columns for room or location name information 4830 and rows for scheduling times 4840.

A company or institution using this software package may also want to secure access to information contained in various parts of the database disclosed herein. This can be done by using passwords to secure those parts or screens of the database and can be done through the Set-up Passwords screen. Clicking the "Set-up Passwords" button on the Set-up System Preferences screen accesses this screen. Although the "Set-up Passwords" button is not shown in FIG. 2, it would be visible using the scroll-bar provided on the Set-up System Preferences screen. This screen provides a screen name field that shows a user all the screens that are available to restrict access using a password (including the Set-up Passwords screen). The scroll bar can be used to access the additional screen names not immediately visible on this screen. The passwords must be entered in the password field immediately below the corresponding screen. Where no value is entered, no restrictions will be placed on that screen and thus no password is required for that screen.

III. The File/Loan Information

Figure 10:
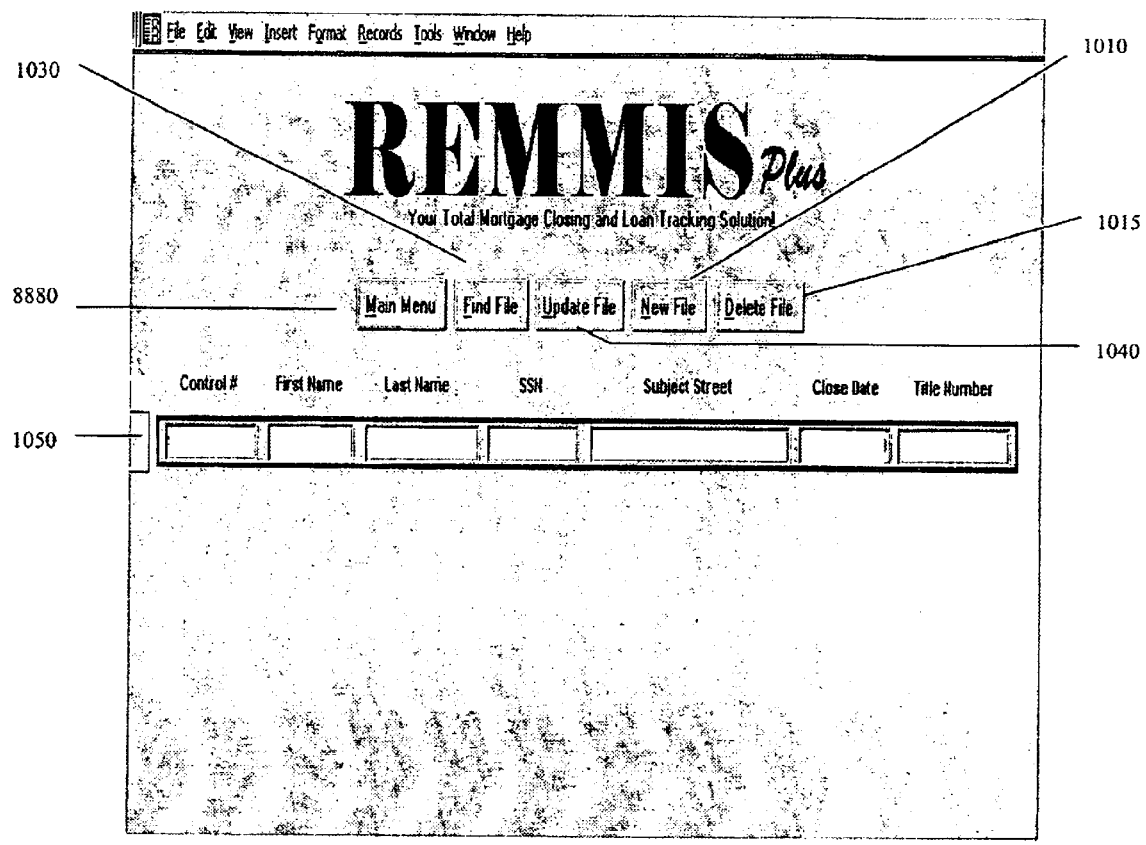
FIG. 10 is an illustration of the Add/Update a File screen.

Once a user has finished setting-up the system or is otherwise ready to enter information relating to a particular closing they can use the "Add/Update a File" button 100 found on the Opening screen. FIG. 10 shows the Add/Update a File screen which tracks each file with a control number and an associated name and social security number. FIG. 10 also illustrates a varied embodiment that uses, rather than a back button 888, uses a button 8880 which performs the same feature but more clearly indicates to where or what screen the user would go back. As with previous screens, there is provided a search feature. This screen shows an additional alternate embodiment that uses a Search button 1030 that leads to a small pop-up window that can either use a drop list or more free form blank search fields that are used to perform a textual search of all records maintained. Various fields should be provided for a free form blank search field search in order to allow a user different ways to search for a particular file, in addition to just the control number or name associated with the file. As with previous screens, a New File button 1010 is provided to enter additional file names and which will automatically generate a control number. Each file uses one row 1050 on this screen with a unique Control number. Although all files would be visible on this screen using the scroll bar, a search feature is useful as a company or institution using this software is likely to accumulate a large number of files that would be tedious to scroll through in order to find a particular file. Once a particular file is selected, either after using the Find File button 1030 or by clicking on the desired record, that record can be changed, viewed or updated using the Update File button 1040 or even deleted using the Delete File button 1015. The delete button should contain a verification request before actually deleting a record to avoid accidental deletions. Also, this delete button can be restricted using the passwords discussed above. Further, the delete button should not allow deletions of files or loans that have already closed.

The Update File button 1040 is actually the primary button used on the Add/Update a File screen as it provides access to numerous other screens containing additional information relating to that file. Also, until now the screens described above have dealt primarily with general set-up of the system, where updating a file starts to track information about a specific loan or real estate closing.

Figure 11:
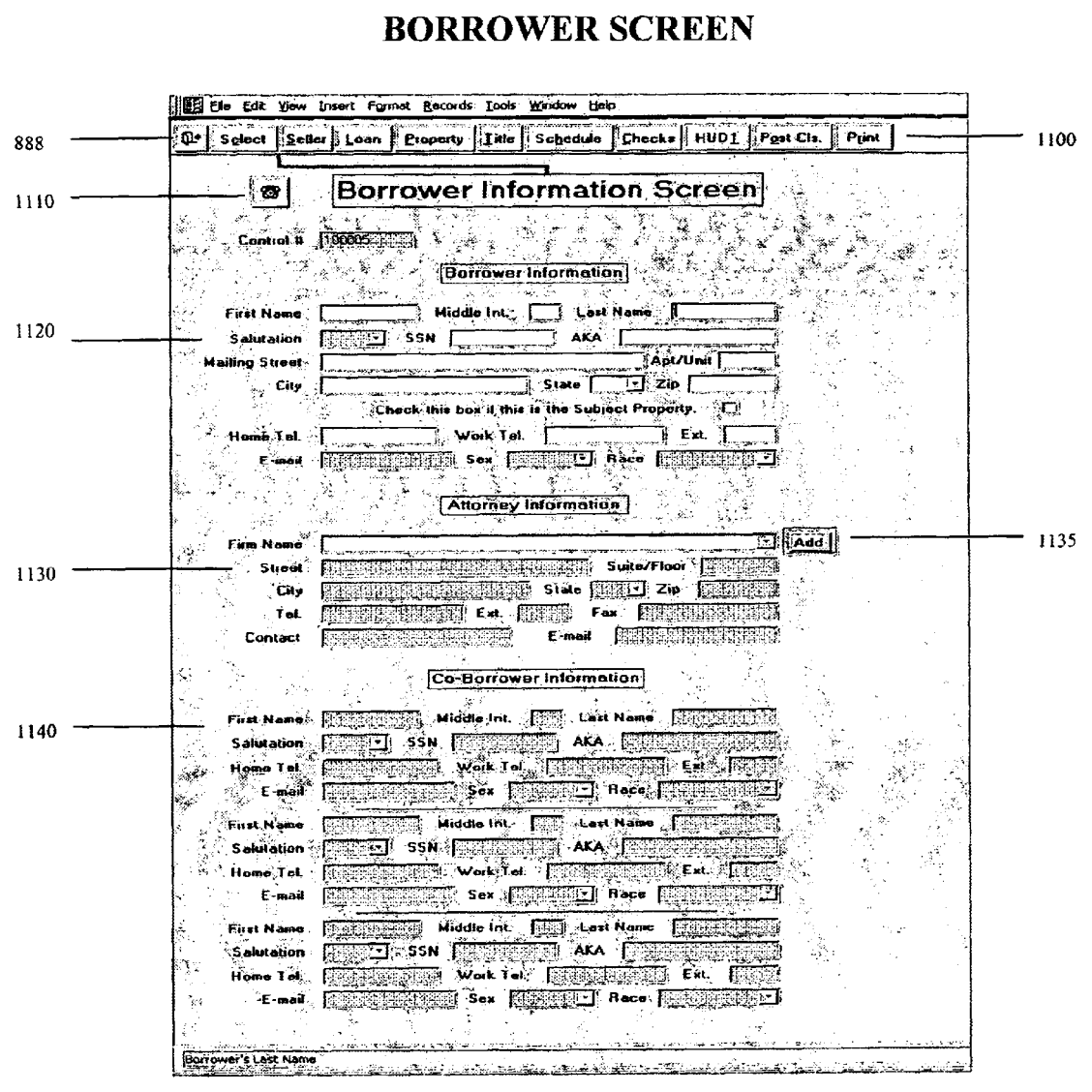

Once a file is selected and the Update File button 1040 is clicked, a user will see the Borrower Information screen seen in FIG. 11. Unlike previous screens, this screen now contains a button/tab system for navigating the various information screens associated with a particular file or loan. A user can go to each desired screen using the navigation bar 1100, which includes a Back button 888 that leads back to the Add/Update a File screen. The Borrower Information screen is where the input for each borrower is done. The illustrated embodiment allows for up to four (4) borrowers per loan, but providing for either a greater or lesser number of borrowers is anticipated. Additionally, this screen and most of the screens accessible on the navigation bar 1100 contain a Conversations Log button 1110. This button allows a user to maintain a log of telephone conversations conducted relating to a particular file and most of the details from that conversation. Most of the remaining fields on this screen are self-explanatory, such as the general/main borrower information fields 1120 and the co-borrower fields 1140. The Attorney Information fields should be used to select an attorney, if any, being used by the borrower(s) in a particular file. A drop down list is provided to select from the attorneys previously entered in the Sub-Servicer Database screen. The general attorney information fields 1130 will display data pertaining to the selected attorney or law firm. If a desired attorney or law firm is not already entered in the database, the Add button 1135 can be used to add attorneys or law firms to the database. Most fields on this screen must be completed as they contain information required for the closing documents. Just a few fields such as the salutation or E-mail fields, though not required, can provide valuable information throughout the closing process and with regard to post closing marketing or promotions to these borrowers.

Figure 12:
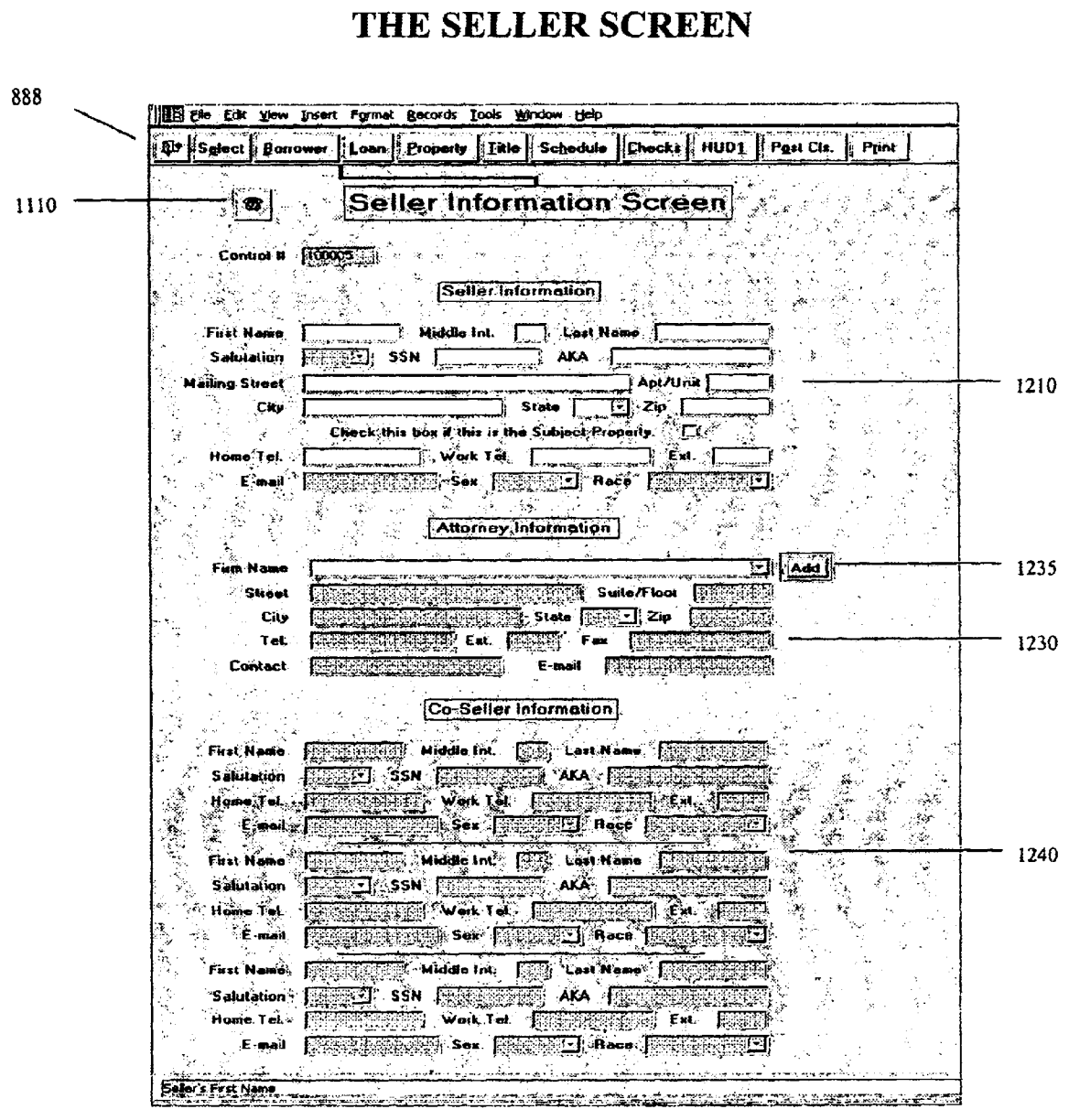

The Seller screen, seen in FIG. 12, is used for entering and viewing information relating to the sellers involved in the selected file. This screen contains analogous fields to those found on the Buyer Information screen, including general seller information fields 1210, Attorney Information fields 1230 and 1235, and provides for up to three co-sellers and information fields 1240 relating to them. Providing for either fewer or greater co-sellers is anticipated. It should be noted that the navigator bar 1100 does not display a navigation button to the screen being displayed as this would be unnecessary and reduces the amount of space available to display the other navigation buttons.

Figure 13:
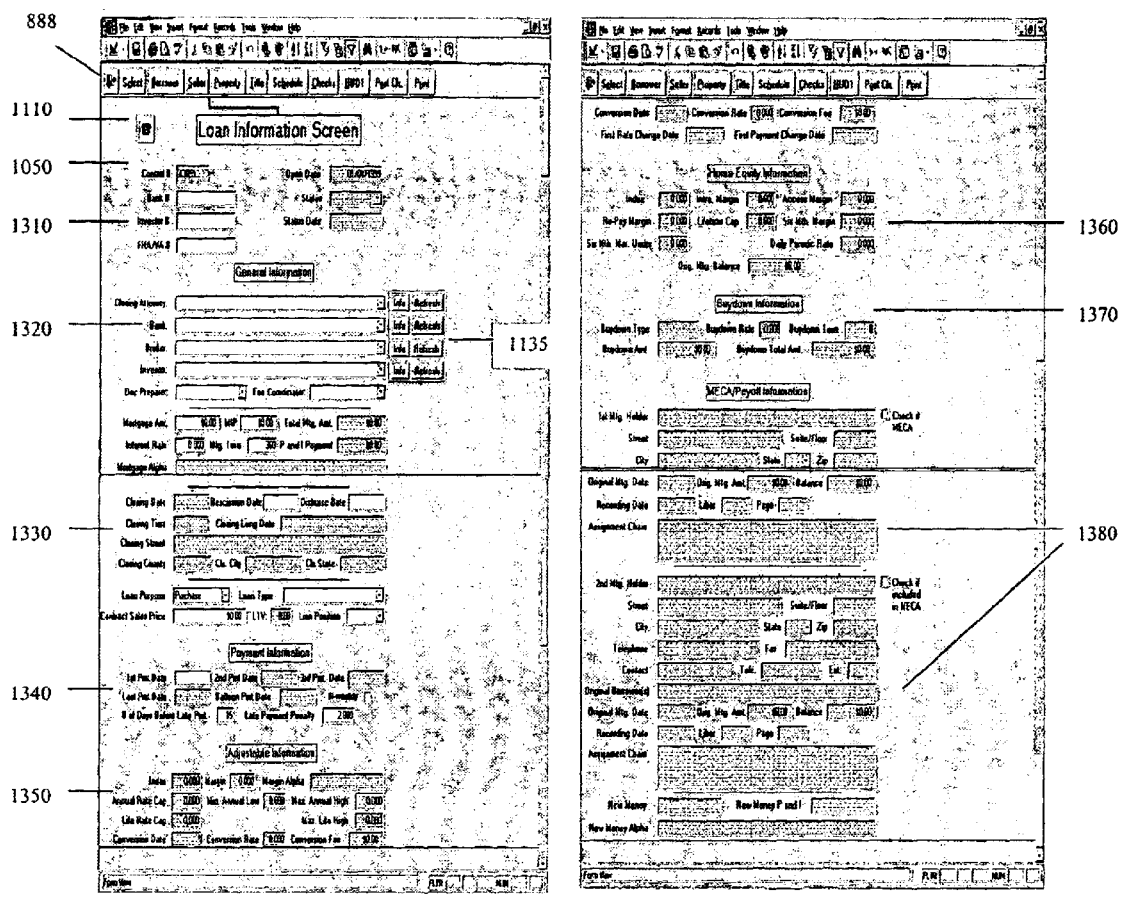
FIG. 13 is an illustration of the Loan screen.

The Loan screen, seen in FIG. 13, is used for entering and viewing information relating to the loan involved in the selected file and is one of the most extensive input screens. It should be noted that FIG. 13 is a compilation of four views from the same screen with each view comprising a different scroll bar position. The screen allows quick reference to all the major components of the loan. First in the General Loan Information fields 1320 & 1330, then the Payment Information fields 1340, then the Adjustable Information fields 1330, the Home Equity Information fields 1360, the Buydown Information fields 1370, and finally the MECA/Payoff Information fields 1380. The initial fields in the General Information fields 1320 contain drop down lists to select an attorney, a bank, a broker or an investor associated with a particular loan. As previously mentioned in the Borrower Information Screen description above, and in particular the Attorney Information fields 1135, Info and Refresh buttons are provided to add or update information relating to the respective lists. This screen demonstrates the usefulness of entering that information ahead of time. What is more, this feature prevents the redundant entry of this type of information since once it is in the database; it only need be amended or selected. This screen further displays the control number fields 1050 and 1310. The control number fields 1310 reflect the selections made in the General Information fields 1320. Further still, the loan Opening Date, Status and Status Date fields 1315 are provided to track information regarding when a money issue has been initiated, what the status of the loan is and when that status was last posted.

Figure 14:
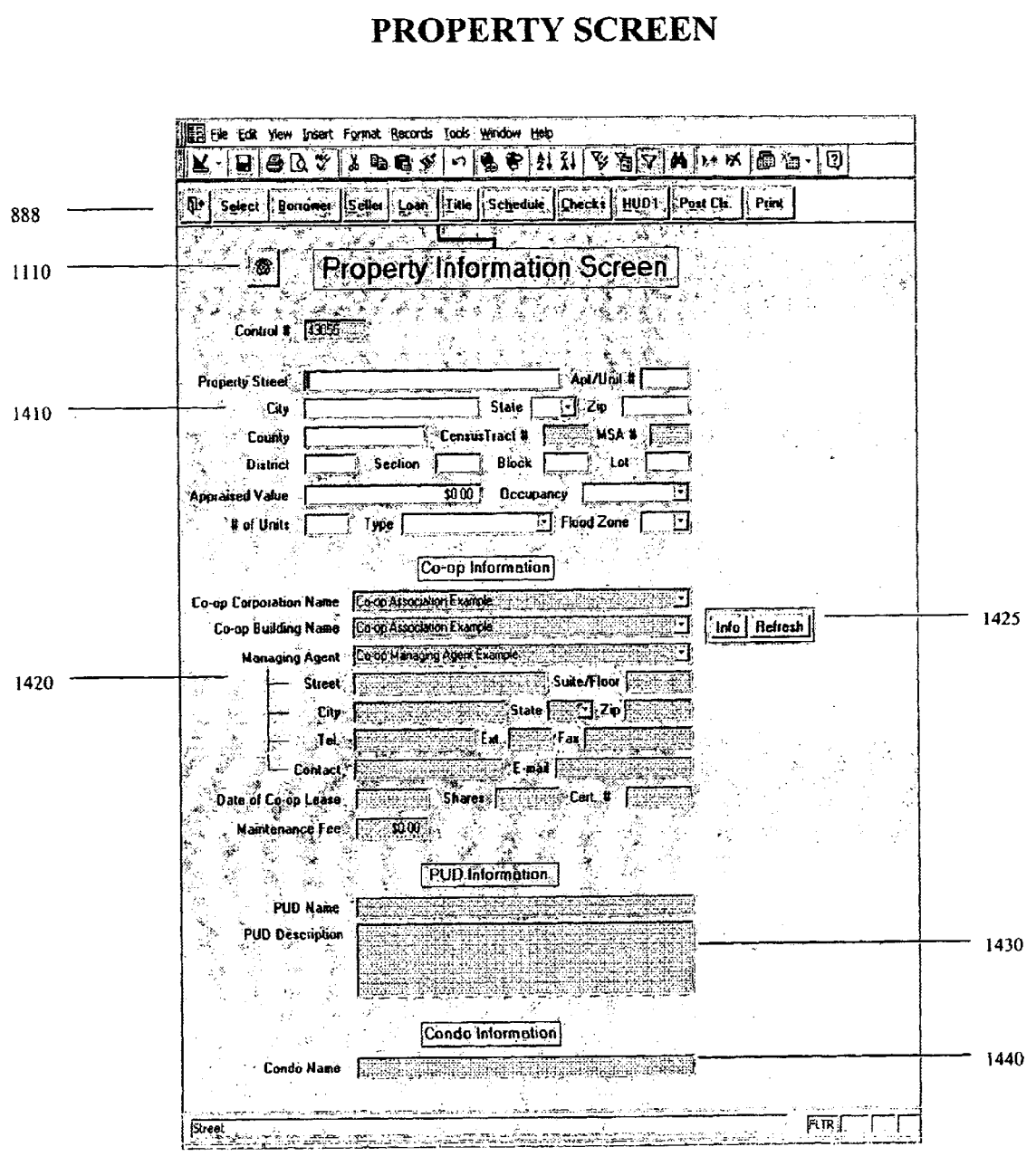

The Property screen, seen in FIG. 14, is used for entering and viewing information relating to the property associated with a selected file. This screen also contains general information fields 1410. Also, were a cooperative group or organization is involved, Co-op Information fields 1420 are provided. Such groups or organizations would be considered Sub-Servicers and could already be entered in the database. If not already entered, Info and Refresh buttons 1425 are provided to update the database. Additionally, PUD (Planned Urban Development) fields 1430 and a Condominium name field 1440 is provided for that information, if applicable.

Figure 15:
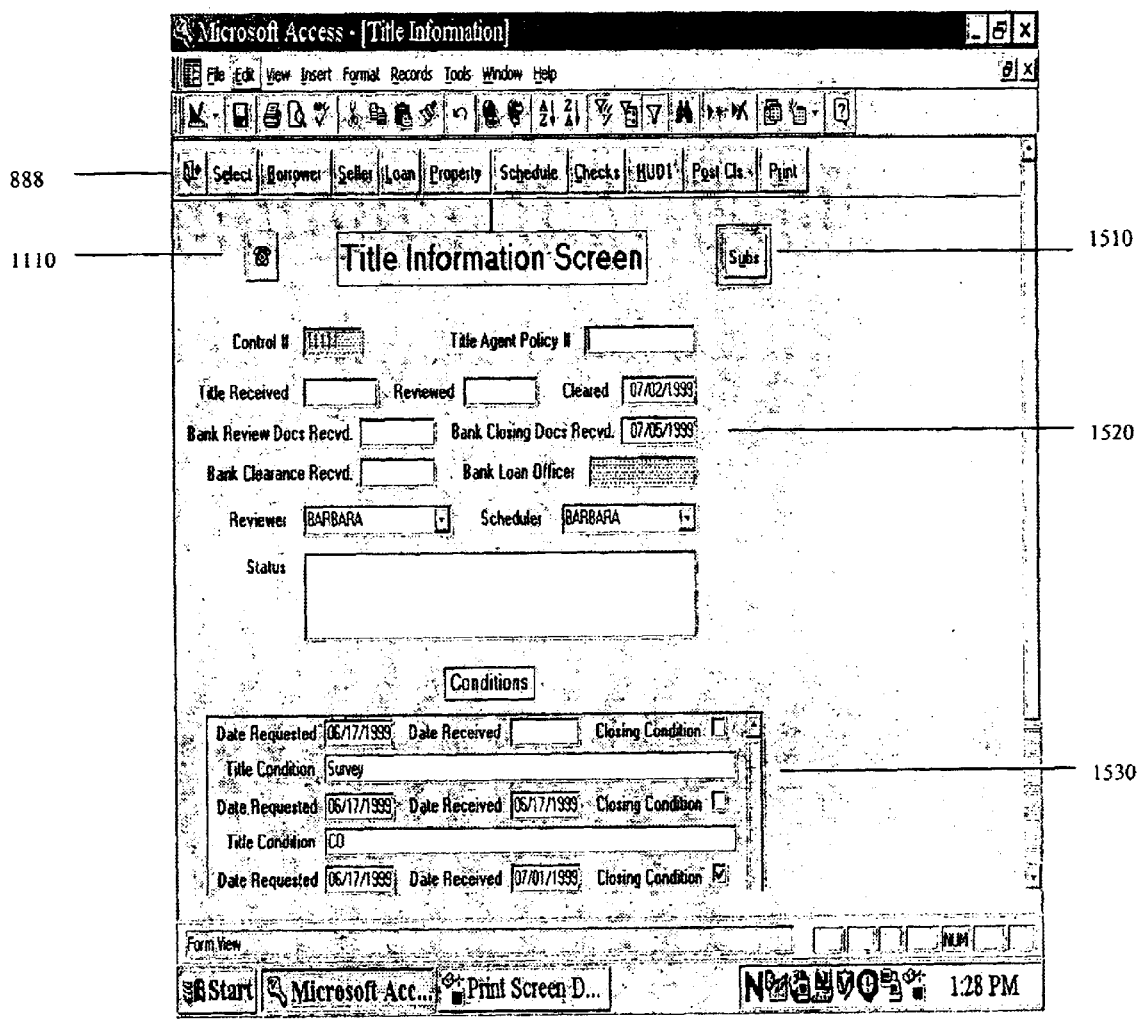
FIG. 15 is an illustration of the Title screen.

The Title screen, seen in FIG. 15, is used for entering and viewing information relating to the legal title to the property involved in the selected file. The general title information fields 1520 track information relating to the receipt and review of the documentation relating to legal title to the property and the documents generated during the closing. Included in such information is a brief description of the status of the title, such as "awaiting CO for the deck" or "needs inspection by lender." Such information can be used in generating reports as discussed more fully below. The "Subs" button 1510 provides direct access to the Sub-Servicer screen where assigned subservices are displayed, ie, homeowner, flood and other insurance companies. Finally, any conditions to passing legal title can be indicated in the Conditions fields 1530. Those conditions can not only be described, but information as to when the condition was imposed, whether it was met or received and whether it is a condition that is required for the closing can be entered. This information is also important in generating reports as discussed more fully below.

Figure 16:
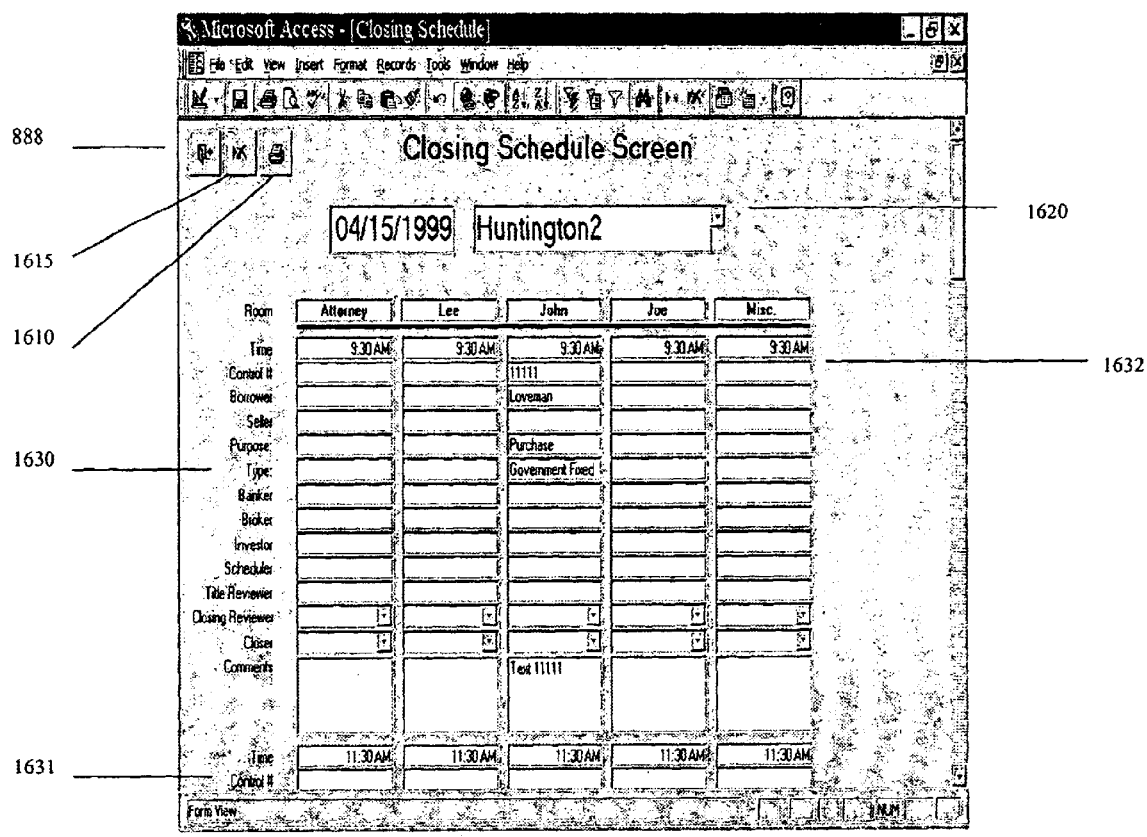
FIG. 16 is an illustration of the Closing Schedule screen.

The Closing Schedule screen, seen in FIG. 16, is used for selecting and viewing when and where the closing will take place. The date and location fields 1620 can be used to select that information. Although any future date can be selected, only locations already set-up in the database can be selected using the drop list provided. By entering the control number in the desired room column 1631 the other related fields 1630 will be automatically filled-in. It should be noted that fields for the subsequent time slots for each room 1632 could be accessed using the scroll bar. This screen also provides a schedule printout function through the print button 1610. Such a printout can be provided to the parties as notification or a reminder of the closing time and location. Further, the delete button 1615 can be used to clear all the information relating to a scheduled closing for a particular file. This feature can be used if it is desired to reschedule a closing.

Figure 17:
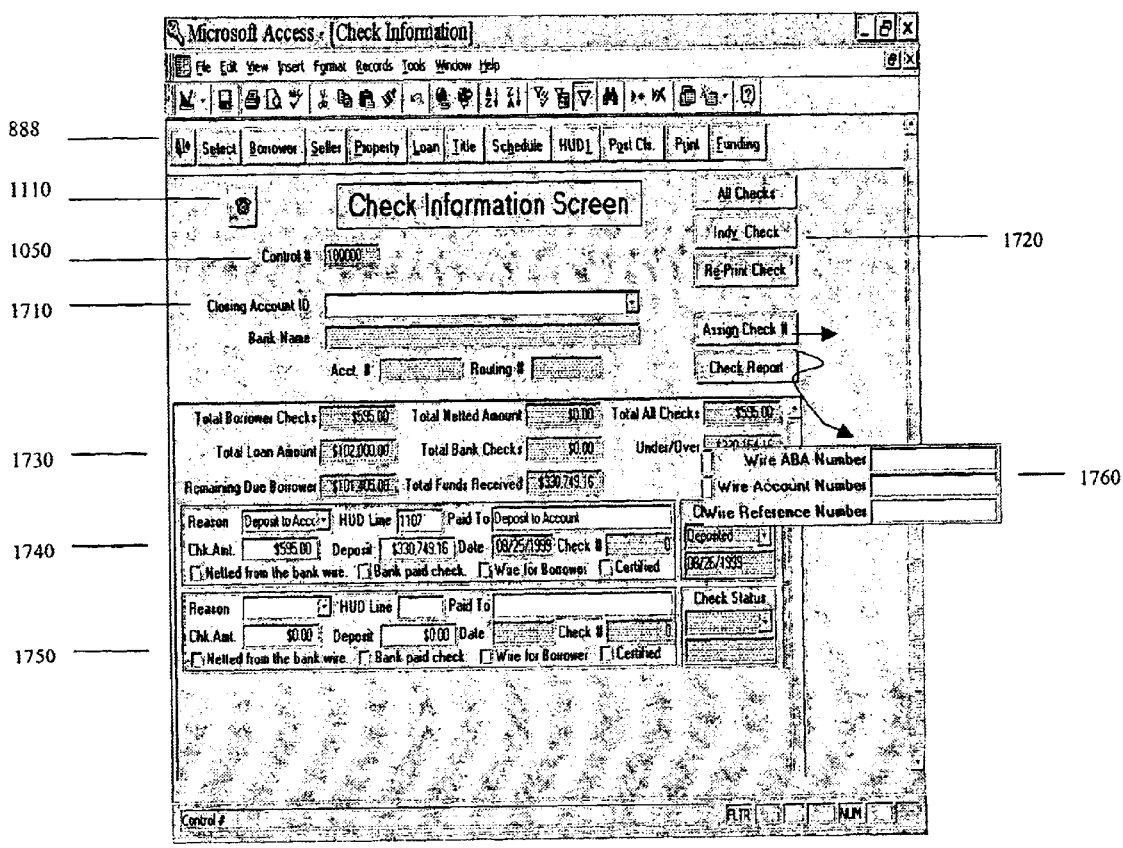
FIG. 17 is an illustration of the Check Information screen.

The Check Information screen, seen in FIG. 17, is used for entering and viewing information relating to the funds necessary for the closing to take place and the checks that must be issued for that event. Some of the information displayed on this screen is obtained when the HUD-1 form/screen is completed, which is discussed further below. By selecting the Closing Account ID from the drop down list 1710 the money fields 1730 are automatically filled-in. These numbers can be edited, the checks printed (if proper approval has been received for this by the issuing bank) and reports can be generated using the check buttons 1720. In viewing the checks involved in a loan and the totals required for the closing, this screen allows a user to reconcile the entire funding of a loan. Net funded items and items paid by a bank are input in the funding fields 1740. This screen, when used in conjunction with the Funding screen discussed in the next paragraph can ensure each closing has been funded properly. Additionally, if funds are to be wired for the Borrower as opposed to writing a check, the funds source check boxes 1750 can be used to indicate such. When using one of the check boxes 1750 indicates a wire transfer, an additional pop-up window 1760 will come up requesting information regarding the wire transfer.

Figure 18:
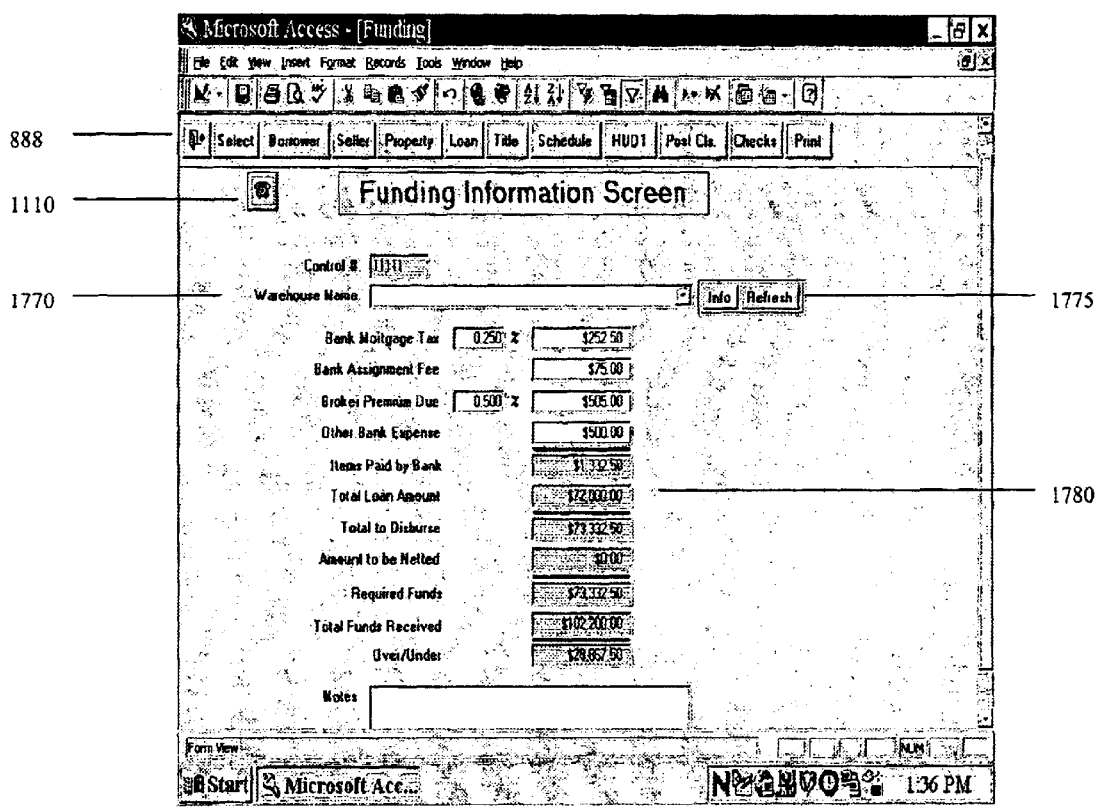
FIG. 18 is an illustration of the Funding screen.

The Funding screen, seen in FIG. 18, is used for entering and viewing information relating to the funding required for the closing for a selected file. This screen is used to account for expenses, funds required to close and actual funding deficiencies. A wire/funding deficiency report can be generated using the Tracking and Reporting features discussed below. This screen allows a user to attribute a warehouse lender to the loan using the warehouse name field 1770 and the Info and Refresh fields 1775 if the required warehouse lender is not already in the database. Additionally, amount needed for mortgage taxes, assignment fees, broker premiums and other bank expenses can be entered in the additional funding fields 1780.

Figure 21:
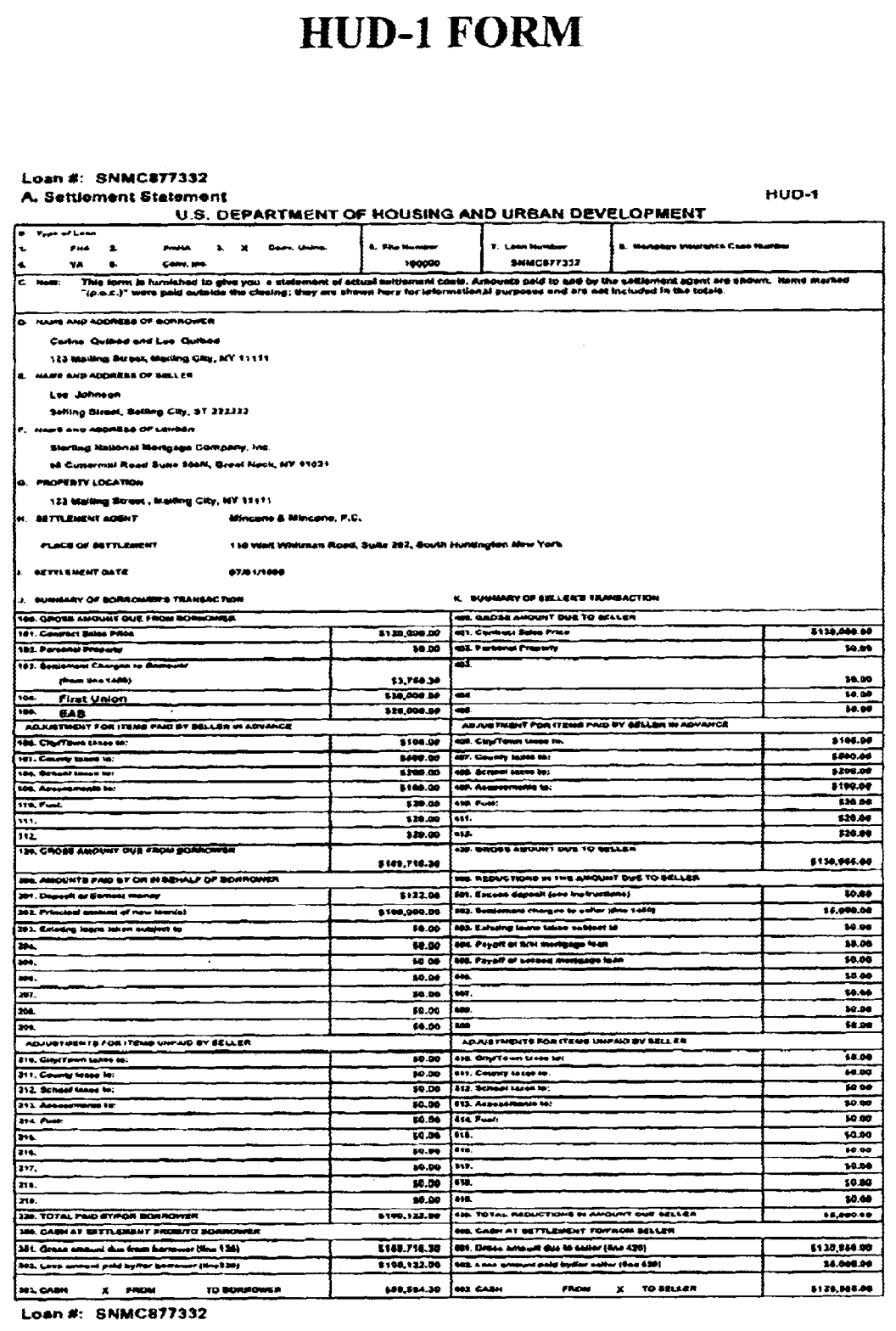

The one government form that is required in all residential real estate closings is the HUD-1, issued by the Department of Housing and Urban Development. This form, page one of which is seen in FIG. 21, contains a basic breakdown of all the monies required from both the buyers and sellers involved in a real estate transaction. FIG. 19 illustrates the first of two screens dedicated to entering HUD-1 information. FIG. 20 shows the second of the two HUD-1 screens. These screens are designed to look and feel just like the actual form. The information entered in the fields on these screens is used to display information on various other screens, such as the Checks and Funding screens. Once again, redundant input is eliminated or minimized. If the HUD-1 cannot be initially completed using the instant system, a blank HUD-1 form can be printed out using the instant invention to allow manual entry of this data for subsequent conversion to electronic form. Also, the instant invention anticipates allowing for the input of electronic signatures so that the HUD-1 and other required forms could be truly completed by the closing date completely in electronic form. The closing documentation is more easily stored and transferred if it is entirely in electronic form. As such, all such documentation can be stored on CD-ROM or other electronic storage medium. Additionally, a package or loan portfolio of these documents can be compiled and transmitted electronically using a global communications network or other means of data transfer.

It should be noted that when viewing the HUD-1 pages one and two screens (FIGS. 19 & 20) that the navigation bar 1105 is different from the previously seen navigation bar 1100. In particular, access to HUD-1 Page two screen is available from the HUD-1 Page one screen and vise versa. Additionally, the Aggregate and Truth In Lending screens are accessible only through the HUD-1 screens.

Figure 22:
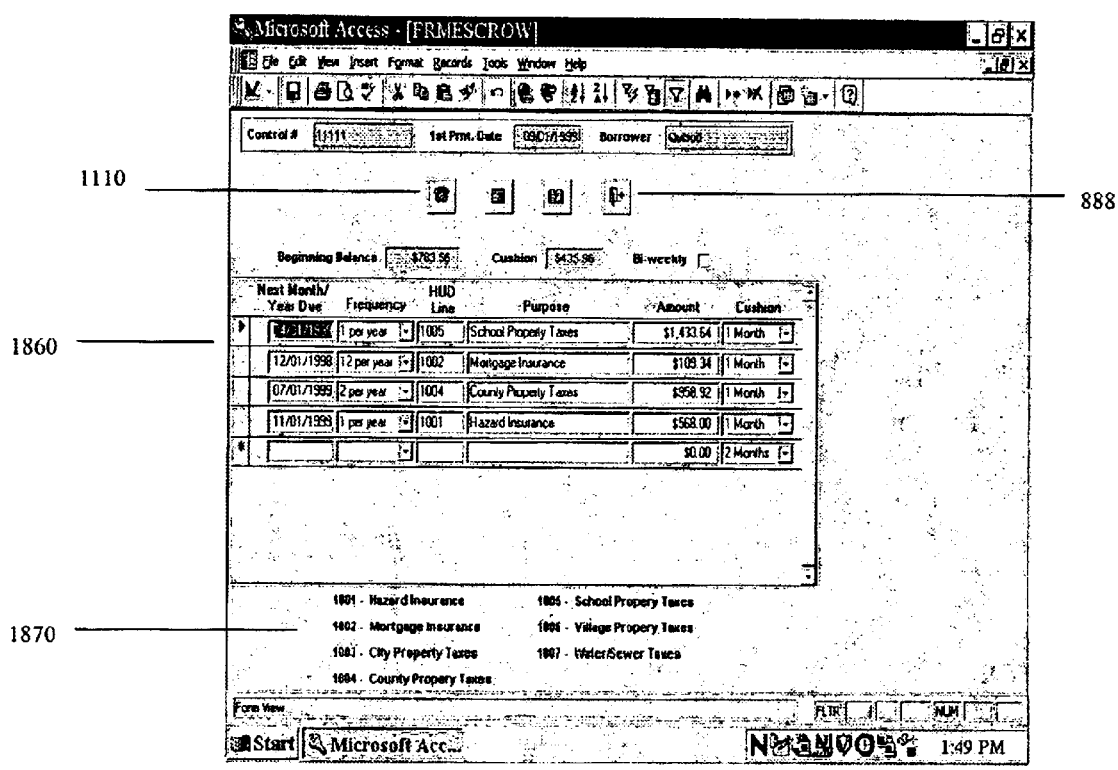
FIG. 22 is an illustration of the Aggregate screen.

The Aggregate screen, seen in FIG. 22, is used for entering and viewing the aggregate adjustment values required for the HUD-1 form. Lines 1001 through 1009 from the HUD-1 include all aggregate adjustment information. By entering information in the general HUD-1 requirements fields 1860, the HUD-1 gets filled-in. The list 1870 found on the lower section of this screen provides a ready reference as to a description of the relevant HUD-1 line numbers.

Figure 23:
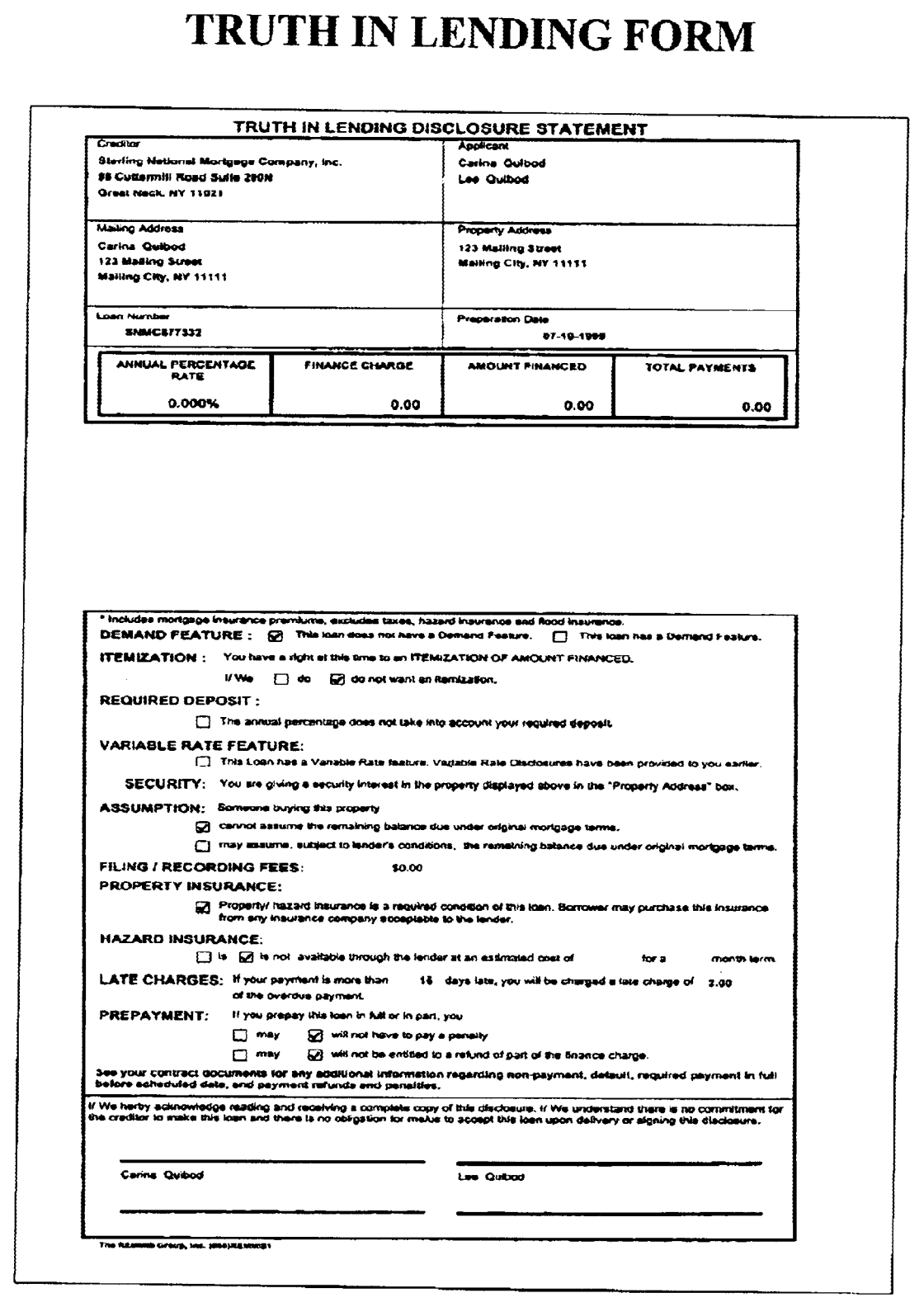

Similar to the above mentioned Federally required HUD-1, financial institutions are required to produce a completed Truth in Lending form that must be reviewed and executed by a mortgagee for such a loan to be binding on that mortgagee. FIG. 23 illustrates an example of such a Truth in Lending form that can be generated. Other loan information reports, such as amortization schedules, can also be printed. All this information is compiled and organized using the database of the instant invention.

Figure 24:
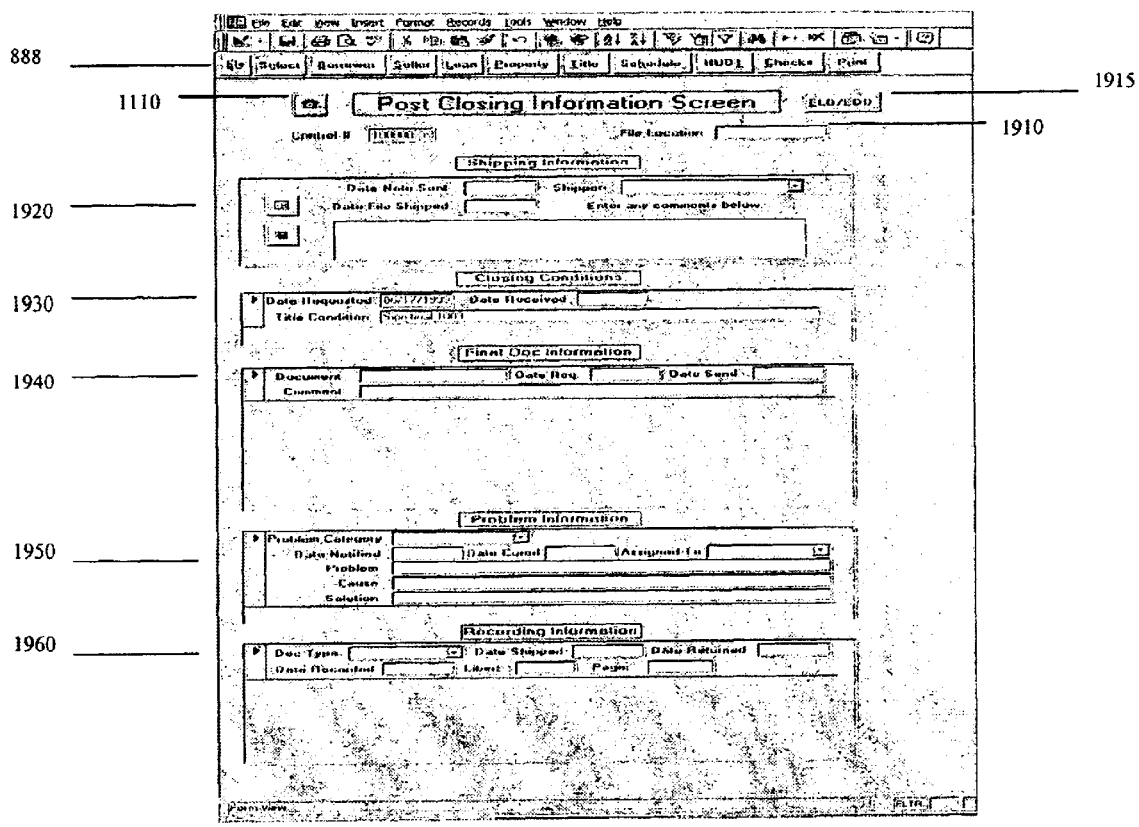
FIG. 24 is an illustration of the Post-Closing screen.

After the closing it is important to track information regarding the documents involved in the closing, such as the documents sent for recording, the progress of the loan and any final document information. FIG. 24 illustrates the Post-Closing screen, which tracks this type of information. The file location field 1910 is provided to track the physical location of the major part of the file associated with a particular loan. This screen anticipates the ability to deliver completed copies of the closing documents electronically. The ELD/EDD button 1915 would be used to make such electronic transmissions of documents. Much of the other information fields, is very important for tracking and reporting of information relating to a file. The shipping information field 1920, the closing conditions field 1930, the final document information field 1940, the problem information field 1950 and the recording information field 1960 all are just such fields.

Figure 25:
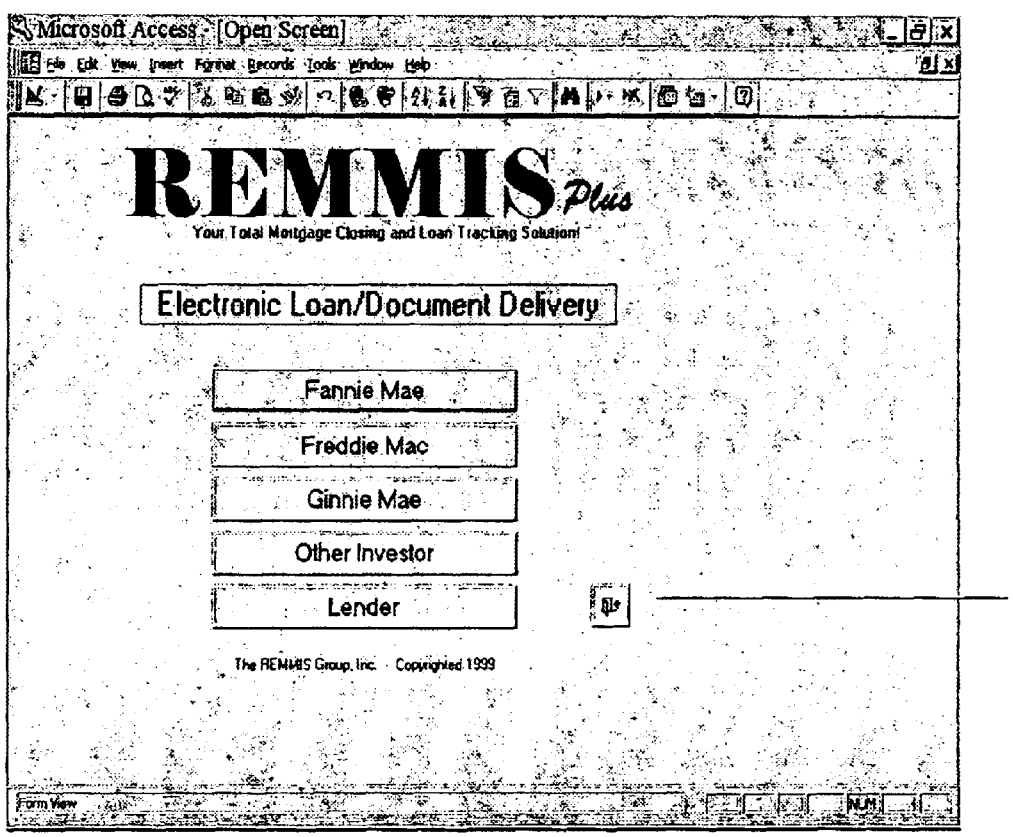
FIG. 25 is an illustration of the ELD/EDD screen.

FIG. 25 illustrates the screen that is displayed when the ELD/EDD button 1915 is clicked on the Post-Closing screen. The Electronic Loan/Document Delivery screen is used to electronically transmit closing documents to various warehouses, lenders, investors and other institutions. Additionally, this screen can be provided with features for importing data or even documents from various sources. In this way Seller, Borrower, Property or even Loan information can be entered into the system while reducing the redundancy and problems of data input. This data transfer can take place using a global communications network such as the Internet or any other means of electronic communication. Alternatively, the Add/Update a File screen could provide access to this import/export data feature.

Figure 26:
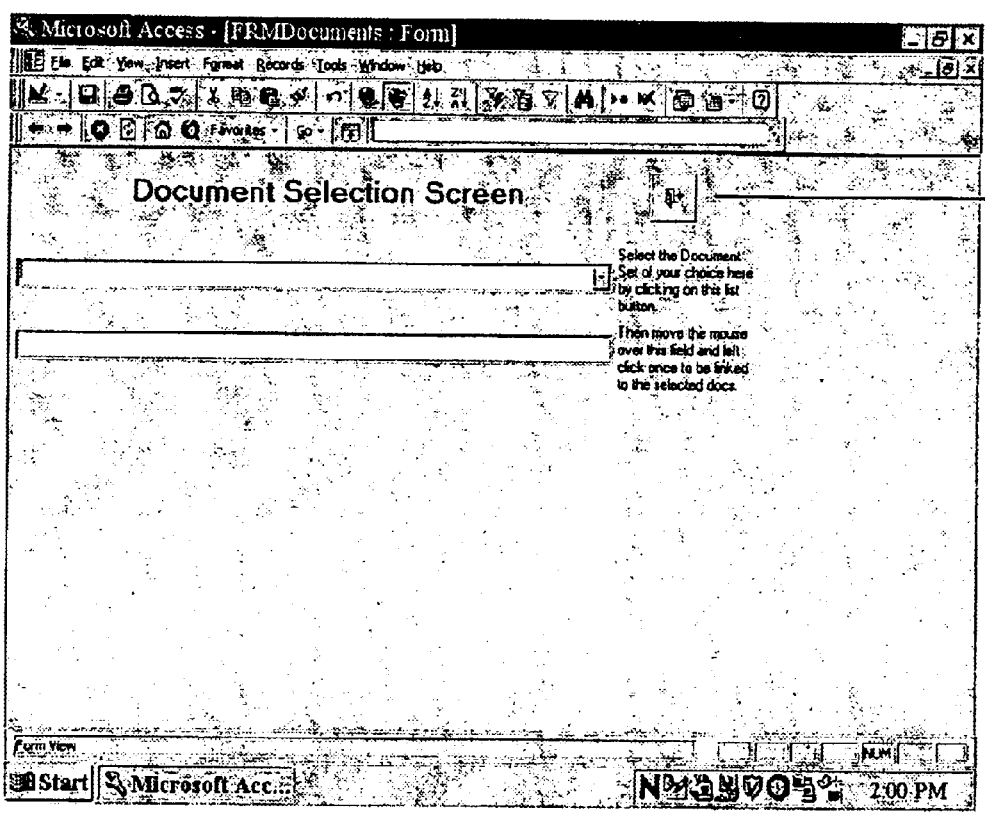
FIG. 26 is an illustration of the Document Selection/Transmition screen.

FIG. 26 shows the Print screen (also referred to as the Document Generation/Transmition screen). This screen is accessed from the navigation bar 1100, and is used to generate final document sets containing a complete loan portfolio along with any ancillary scanned documents and documents that have electronically integrated signatures.

Figure 27:
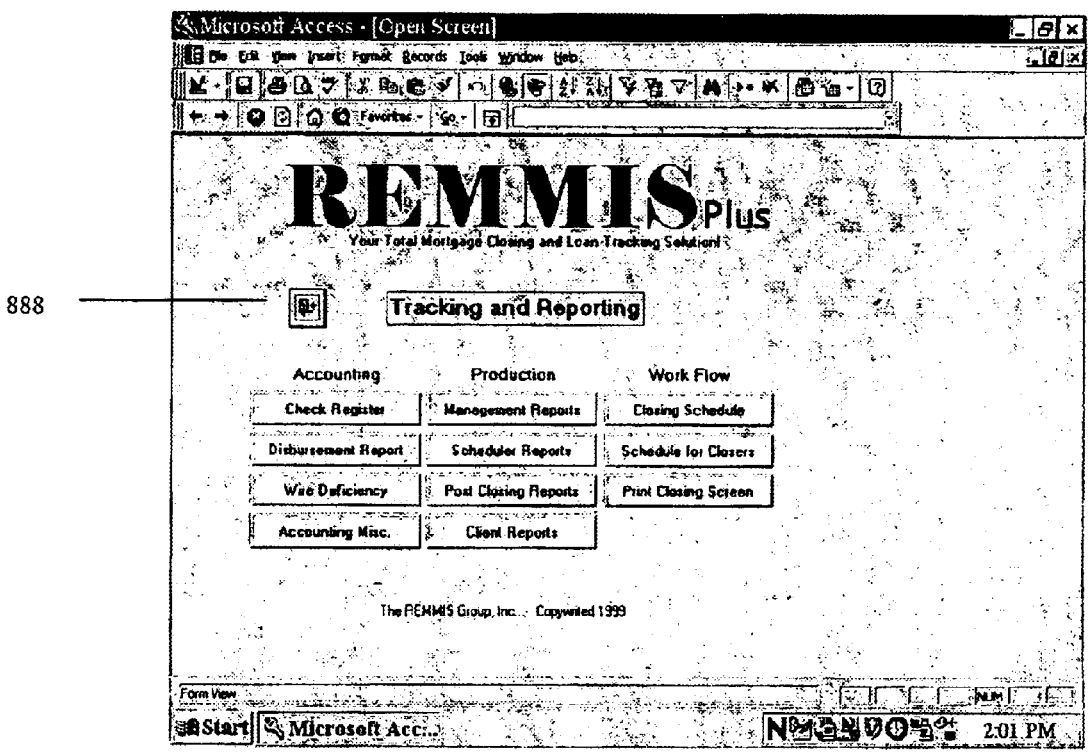
FIG. 27 is an illustration of the Tracking and Reporting screen.
Figure 1:
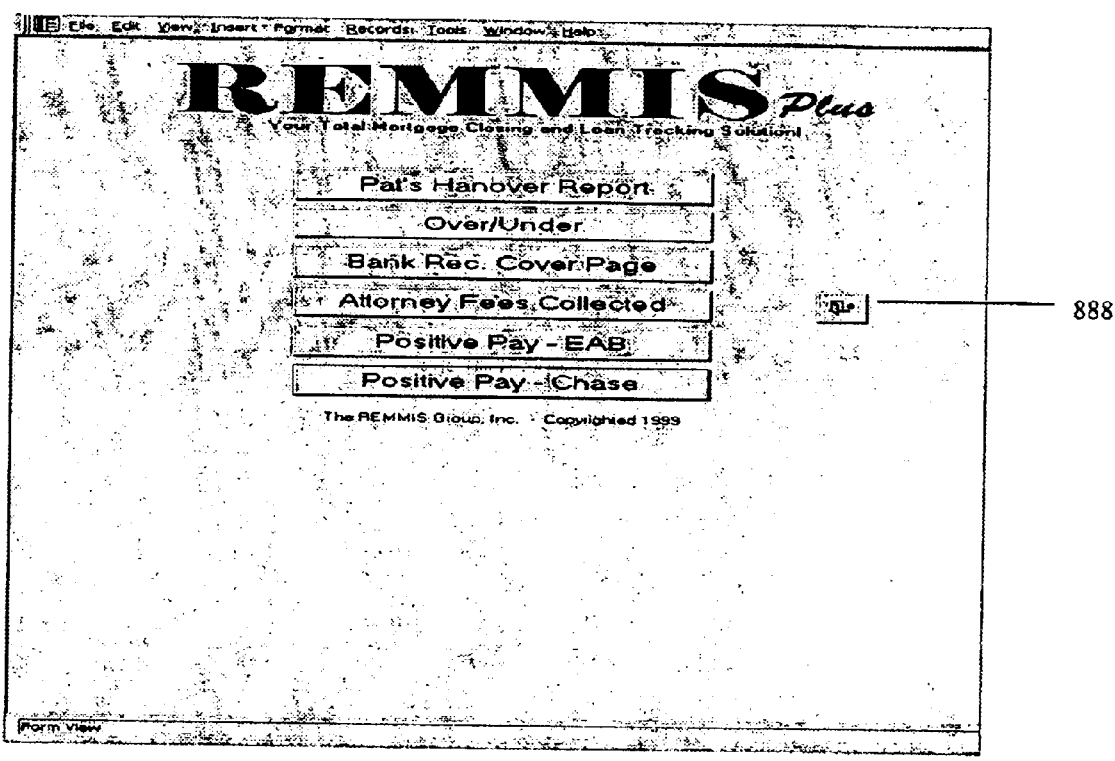

The Tracking and Reporting screen, seen in FIG. 27 is used for generating reports relating to accounting, production and workflow. It is anticipated that these reports can be of various formats so as to display the data entered in all the fields discussed above. The databases used in the instant invention provide for selective sorting and filtering of the desired data so as to provide the ability to truly generate custom tailored reports. The screen shown in FIG. 27, illustrates particular management reports or analysis screens that assist in maintaining higher levels of productivity in conducting real estate transactions.

As is seen in FIG. 27, the information being tracked or analyzed is broken down into three categories; accounting, production and work flow. The accounting section refers almost entirely to the funds transferred between parties during a real estate transaction. The production section is a catch-all section that relates to the outstanding items or details of real estate transactions that must be followed-up on and reviewed. The work flow section refers to the handling of numerous real estate transactions being performed by more than just a few of real estate professionals, or Closers.

With respect to the accounting section, the Check Register button leads to screens and not reports that display information relating to the checks issued to cover the payments associated with a closing. These payments include not only the payment to the seller, but also numerous other payments such as various taxes, insurance and other fees. Virtually, any payment that needs to be made in order to close the transaction can be made through the system. Most commonly, these payments include mortgage, title, flood and homeowner's insurance; recording and real estate taxes; appraisal, broker, attorney and other professional fees.

The Disbursement Report button generates reports that track the funds that need to be disbursed and on what dates. This is necessary not only because numerous checks are being issued, but also because very often the funds for one closing are disbursed on more than one day. This is common, as many lenders required a waiting period before funds will be released, due to a buyer's right of rescission for a number of days after the closing.

The Wire/Funding Deficiency button generates reports that track the amounts of money being disbursed, through check writing, versus the amount of money funded by the lender. Although these numbers should be the same, they are more often not. This happens because of the many last minute adjustments and because lenders sometimes hold back a portion of the funds until after the right of rescission period. Since the borrower needs the money at the closing, the system can issue all the needed funds and then track that deficiency until the lender releases the additional funds. Another reason for this imbalance of funds is that prior to the closing, the calculated loan amount is just an estimate.

Figure 28:
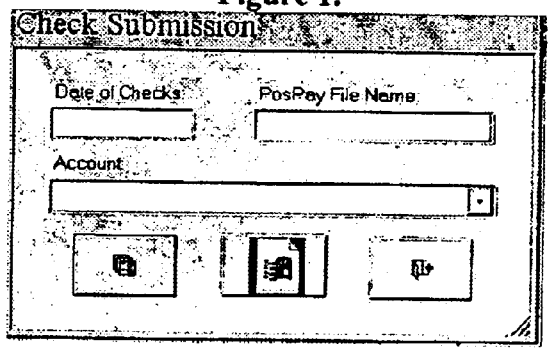
FIG. 28 is an illustration of the Accounting Miscellaneous screen.

The Accounting Miscellaneous screen, seen in FIG. 28 is used as a catchall for additional information that needs to be maintained throughout this process. Customized reports, such as "Pat's Hanover Report" can be accessed through this screen. Such a customized report can contain organized information relating to any of the fields of information collected by this instant system in all the previously mentioned screens. The "Over/Under" button can generate a deficiency report that is similar to the "Wire/Funding Deficiency" button discussed above. Since it is in a report format, the information can be presented differently. In other words, the "Over/Under" report is presented in an accounting format. The Attorney Fees Collected" button can generate a report that shows what attorneys fees were paid. The "Positive pay" buttons, generates a report for the licensee of the method and system of the instant invention, which is electronically sent to financial institutions. These reports indicate what checks were electronically generated during the transactions of the instant invention for each particular financial institution issuing such checks. Since more than one check writing account can be maintained with each financial institution, it is anticipated that all accounts relating to one particular financial institution will be transmitted simultaneously. The financial institutions would match these reports with their records of checks cleared for transactions from the licensee sending the report. As can be seen in FIG. 28, buttons can be designated for particular financial institutions. Alternatively, one button can be provided, which leads to another screen where the financial institution can be selected. All data transfers should be done electronically to minimize redundant data entry, as is a general theme of the instant invention.

The first set of reports within the Production section is the "Management Reports." These reports are designed for managers to track information organized by financial institution, real estate brokers, scheduling and the employees that schedule and participate in closing loans. As is seen on the Management Reports screen, the reports are listed. The different reports can be broken down into two sections; the new business or closed loans. The new business reports all are keyed or organized off of the date each file was opened or started. The closed loans reports all are keyed off of the closing date for the loan relating to each file. The "Banker" reports show each borrower's name, listed in date order and organized by bank (the bank or banker corresponds to the financial institution making the loan to each borrower). The "Sum" report is an abbreviated version of the earlier report, only providing the number of transactions involving each bank, broker or scheduler. The "Broker" and "Scheduler" reports are similar to the "Banker" reports, but organized by real estate broker and the scheduler (the persons scheduling the closings), respectively.

The "Scheduler Reports" button (located back on the Tracking and Reporting screen) leads to a group of reports that show the status of loans and real estate transactions, but organizes the information according to Bank, Broker and Scheduler. Additionally, other screens, such as the Scheduler Reports screen can be provided to show reports for tracking Bank and specific loan officer inventory (i.e., loans). Although not shown, a button could be added to generate a report that tracks inventory or loans, organized by broker. These reports differ from the Management Reports in that they are limited to active files.

The "Post Closing Reports" button leads to a group of reports relating to information regarding the closed loans and anything that needs to done after the closing. The "Shipping Report" provides information about the physical transfer of the hardcopy files, including the negotiable instrument (the loan note), which makes up the loan. Since the notes are sent to warehouse lenders, under cover of bailee letter, their transfer must be documented and tracked. The "Final Doc Report" lists any documents requested, but not available at the closing. Such unavailable documents include but are not limited to homeowner's or flood insurance policies or other documents required for passing of the title to the property.

The "Problem Reports" relate to similar information as the Final Doc Report, but tracks information across all closings, as opposed to a single closing. These reports are designed to assist management in determining what areas or parts of the loan closing procedure need to be improved. These reports can reveal items missed by a closer, HUD-1's that need to be redone, unassigned or missing documents and even misspellings or typographical errors made on documents that need to be corrected. The Open and Closed versions of these reports related to open and closed files.

The "Recording Report" shows assignments, deeds and mortgages that have been filed with the county clerk. Currently, it is required that these filings be physically done at the local county clerk's office. It is anticipated, that in the near future, such filings can be done electronically, either to the local county clerk or to a national repository for such electronic documents.

The "Client Reports" button is dedicated to customized reports required or requested by particular lending institutions or other clients. These reports can contain virtually any information contained within the database of the instant invention.

The "Archive Closed Files" button allows maintenance of the database, in that closed files can be taken off the list of active files. This process, known as archiving, will impact reports that address only active files. The archiving is done by closing date, so that any files closed on or before the entered date will be archived.

The final section relates to Work Flow. The names to these reports explain their contents. Basically, the "Closing Schedule" shows a schedule or outline of all closings set to take place. The "Scheduler for Closers" organizes the Closing Schedule report by the closer (the individual managing that actual closing). This report provides the same as the information available on the Closing Schedule Screen. The "Print Closing Screen" report will print the Closing Schedule Screen directly.

Figure 29:
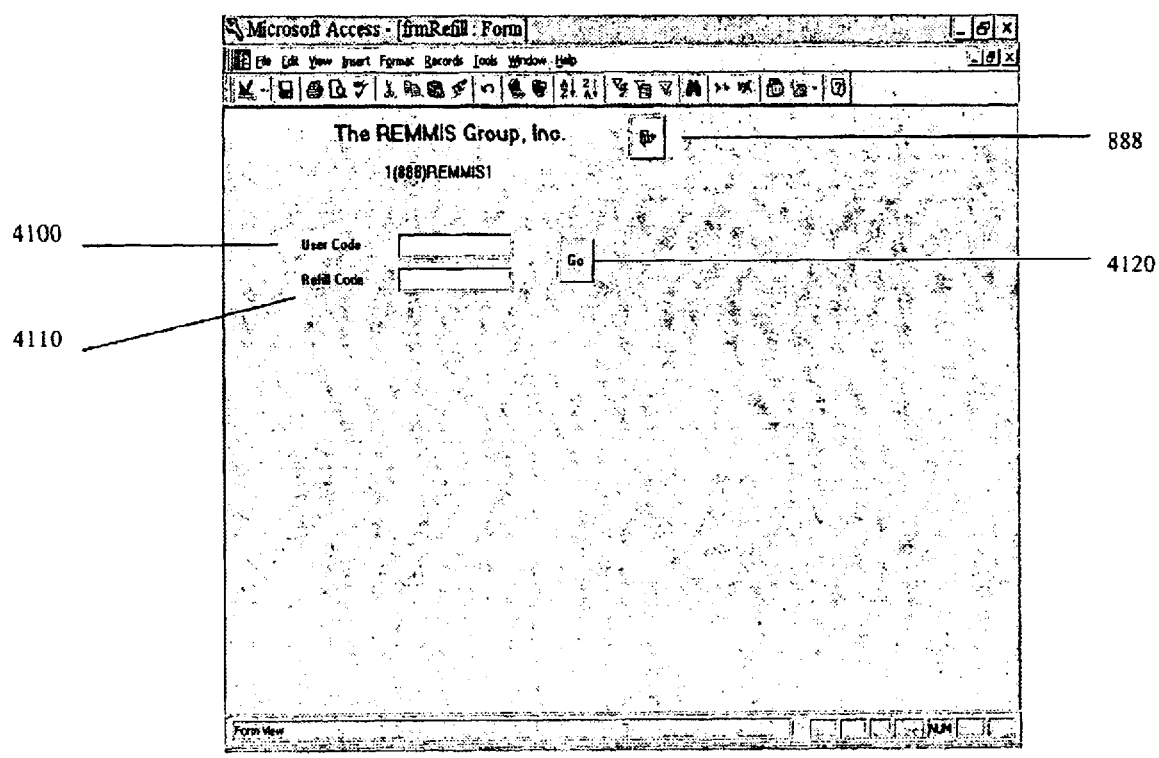
FIG. 29 is an illustration of the Ordering More Closings screen.

Finally, the Ordering More Closings screen, seen in FIG. 29 is used to limit the number of mortgage closings that can be performed by users of the instant system and method. It is anticipated that the database and software package will be licensed for a limited number of uses. A licensee, after paying an agreed upon fee, will be given a new User Code 4100 and Refill Code 4110 which will provide a set amount of additional transactions. Once entered, a user would click Go 4120 and the system will be reset. It is further anticipated that programs can differentiate the types of codes that could be given and entered to reset the system in order to allow customers varied amounts of additional transactions, depending on their license agreement.

Thus it is apparent that there has been provided in accordance with the invention that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What is claimed is:

1. A method of using a computer to facilitate a real estate transaction comprising:

inputting into said computer first party information identifying a first party who has an ownership in a real estate property;

inputting into said computer second party information identifying a second party seeking to purchase said property;

inputting into said computer property information identifying said property;

inputting into said computer terms of sale, comprising the conditions that must be satisfied before said real estate transaction is complete;

maintaining in said computer a plurality of form documents, said form documents each including at least one field corresponding to parts of at least one of said first party information, said second party information, said property information and said terms of sale;

preliminarily compiling on said computer at least one of said form documents, wherein said preliminarily compiled at least one form document includes parts of said at least one of said first party information, said second party information, said property information and said terms of sale, integrated into substantially all fields contained in said at least one of said form documents;

displaying said preliminarily compiled at least one form document to at least one of said first party and said second party;

inputting into said computer at least one signature indicating an approval of said preliminarily compiled at least one form document by said at least one of said first party and said second party, said at least one signature comprising a digitally encrypted signature of said at least one of said first party and said second party who has approved said preliminarily compiled at least one form document;

finally compiling on said computer said preliminarily compiled at least one form document after it has been approved by said at least one of said first party and said second party, wherein said finally compiled at least one form document includes a de-encrypted version of said at least one signature;

outputting from said computer said finally compiled at least one form document;

inputting into said computer a digitally scanned image of at least one ancillary document, and outputting from said computer said at least one ancillary document in conjunction with said at least one finally compiled at least one form document.

2. The method of claim 1, wherein said finally complied at least one form document comprises documents needed to pass title of said property.

3. The method of claim 1, wherein said second party information comprises financial information relating to the funds that will be used to purchase said property, said financial information comprising loan information identifying at least one financial institution lending said funds for said purchase of said property.

4. The method of claim 3, wherein said second party information further comprising at least the minimum financial information required by said at least one financial institution before it will lend said funds for said purchase of said property.

5. The method of claim 4, wherein said plurality of form documents comprises documents required by said at least one financial institution before it will lend said funds for said purchase of said property.

6. The method of claim 3, wherein outputting from said computer further comprises:

transmitting by means of a global electronic communications network said finally compiled at least one form document to said financial institution.

7. The method of claim 3, further comprising:

inputting into said computer at least one calendar date, said at least one calendar date comprising the date on which said preliminarily compiled at least one form document is displayed to at least one of said first party and said second party for approval.

8. The method of claim 7, further comprising:

outputting from said computer a notice of said at least one calendar date to at least one of said first party, said second party and said financial institution.

9. The method of claim 7, further comprising:

outputting from said computer a report comprising data inputted into said computer relating to a plurality of real estate transactions.

10. The method of claim 9, wherein said report comprises financial information.

11. The method of claim 9, wherein said report comprises at least one of said first party information, second party information and property information.

12. The method of claim 11, wherein the steps of inputting first party information, second party information, and property information does not include the redundant input of any parts of the information, relating to the respective said first party, said second party and said property.

13. The method of claim 12, wherein the step of inputting property information comprises title information indicating all parties with an ownership right in said property.

14. The method of claim 1, wherein said finally compiled at least one form document comprises at least one physical negotiable financial instrument or check.

15. The method of claim 14, wherein said at least one physical negotiable financial instrument or check comprises at least a portion of the funds required by the terms of sale from said second party.

16. The method of claim 14, wherein said at least one physical negotiable financial instrument comprises at least a portion of the funds required by the terms of sale from said first party.

17. The method of claim 1, wherein said preliminarily compiled at least one form document is displayed to both said first party and said second party.

18. The method of claim 17, wherein said preliminarily compiled at least one form document is displayed to said first party at a remote location from where said preliminarily compiled at least one form document is displayed to said second party.

19. The method of claim 18, wherein said preliminarily compiled at least one form document is displayed to at least one of said first party and said second party using a global electronic communications network.

20. The method of claim 1, wherein said preliminarily compiled at least one form document comprises disclosure documents required by federal, state or local governments with power to regulate the sale or transfer of said property.

21. A method of using a computer to facilitate a real estate transaction comprising:

inputting into said computer first party information identifying a first party who has an ownership in a real estate property;

inputting into said computer second party information identifying a second party seeking to purchase said property;

inputting into said computer property information identifying said property;

inputting into said computer terms of sale, comprising the conditions that must be satisfied before said real estate transaction is complete;

maintaining in said computer a plurality of form documents, said form documents each including at least one field corresponding to parts of at least one of said first party information, said second party information, said property information and said terms of sale;

preliminarily compiling on said computer at least one of said form documents, wherein said preliminarily compiled at least one form document includes parts of said at least one of said first party information, said second party information, said property information and said terms of sale, integrated into substantially all fields contained in said at least one of said form documents;

displaying said preliminarily compiled at least one form document to at least one of said first party and said second party;

inputting into said computer at least one signature indicating an approval of said preliminarily compiled at least one form document by said at least one of said first party and said second party, said at least one signature comprising a digitally encrypted signature of said at least one of said first party and said second party who has approved said preliminarily compiled at least one form document;

finally compiling on said computer said preliminarily compiled at least one form document after it has been approved by said at least one of said first party and said second party, wherein said finally compiled at least one form document includes a de-encrypted version of said at least one signature;

outputting from said computer said finally compiled at least one form document;

inputting into said computer a digitally scanned image of at least one ancillary document, and outputting from said computer said at least one ancillary document in conjunction with said at least one finally compiled at least one form document;

wherein said finally compiled at least one form document comprises documents needed to pass title of said property;

wherein said second party information comprises financial information relating to the funds that will be used to purchase said property, said financial information comprising loan information identifying at least one financial institution lending said funds for said purchase of said property;

wherein said plurality of form documents comprises documents required by said at least one financial institution before it will lend said funds for said purchase of said property; and wherein the steps of inputting first party information, second party information, and property information does not include the redundant input of any parts of the information, relating to the respective said first party, said second party and said property.

22. The method of claim 21, wherein said preliminarily compiled at least one form document is displayed to said first party at a remote location from where said preliminarily compiled at least one form document is displayed to said second party and wherein said preliminarily compiled at least one form document is displayed to at least one of said first party and said second party using a global electronic communications network.

23. The method of claim 22, wherein said finally compiled at least one form document comprises at least one negotiable financial instrument or check.

\* \* \* \* \*